United States Patent
Groever et al.

(10) Patent No.: US 11,835,680 B2
(45) Date of Patent: Dec. 5, 2023

(54) META-LENS DOUBLET FOR ABERRATION CORRECTION

(71) Applicant: PRESIDENT AND FELLOWS OF HARVARD COLLEGE, Cambridge, MA (US)

(72) Inventors: Benedikt Groever, Cambridge, MA (US); Wei-Ting Chen, Cambridge, MA (US); Federico Capasso, Cambridge, MA (US)

(73) Assignee: PRESIDENT AND FELLOWS OF HARVARD COLLEGE, Cambridge, MA (US)

(*) Notice: Subject to any disclaimer, the term of this patent is extended or adjusted under 35 U.S.C. 154(b) by 387 days.

(21) Appl. No.: 16/610,896

(22) PCT Filed: May 4, 2018

(86) PCT No.: PCT/US2018/031204
§ 371 (c)(1),
(2) Date: Nov. 4, 2019

(87) PCT Pub. No.: WO2018/204856
PCT Pub. Date: Nov. 8, 2018

(65) Prior Publication Data
US 2021/0149081 A1 May 20, 2021

Related U.S. Application Data

(60) Provisional application No. 62/501,422, filed on May 4, 2017.

(51) Int. Cl.
*G02B 1/00* (2006.01)
*G02B 5/18* (2006.01)
*B82Y 20/00* (2011.01)

(52) U.S. Cl.
CPC ........... *G02B 1/002* (2013.01); *G02B 5/1809* (2013.01); *B82Y 20/00* (2013.01)

(58) Field of Classification Search
CPC .. G02B 27/4205; G02B 1/002; G02B 5/1809; G02B 13/18; B82Y 20/00
See application file for complete search history.

(56) References Cited

U.S. PATENT DOCUMENTS 4,777,116 A  10/1988  Kawatsuki et al.
8,169,703 B1  5/2012  Mossberg et al.
(Continued)

FOREIGN PATENT DOCUMENTS

CN  104067171 A  9/2014
CN  111580190 B  12/2021
(Continued)

OTHER PUBLICATIONS

Chen et al. ("Engineering the phase front of light with phase-change material based planar lenses", Sci Rep 5, 8660 (2015), Published Mar. 2, 2015). (Year: 2015).*
(Continued)

*Primary Examiner* — Jonathan Y Jung
(74) *Attorney, Agent, or Firm* — FOLEY & LARDNER LLP

(57) ABSTRACT

An optical device comprises a first meta-lens and a second meta-lens. The first meta-lens includes a first plurality of nanostructures that define a first phase profile of the first meta-lens. The second meta-lens includes a second plurality of nanostructures that define a second phase profile of the second meta-lens. A combination of the first meta-lens having the first phase profile and the second meta-lens having the second phase profile is configured to achieve a diffraction-limited focusing and correct an aberration of light transmitted through the optical device.

26 Claims, 23 Drawing Sheets

(56) References Cited

U.S. PATENT DOCUMENTS

| | | | |
|---|---|---|---|
| 9,310,535 | B1 | 4/2016 | Greiner et al. |
| 9,995,930 | B2 | 6/2018 | Arbabi et al. |
| 10,310,148 | B2 | 6/2019 | Stewart et al. |
| 10,539,723 | B2 | 1/2020 | Iazikov et al. |
| 10,725,290 | B2 | 7/2020 | Fan et al. |
| 11,366,296 | B2 | 6/2022 | Devlin et al. |
| 2013/0032949 | A1 | 2/2013 | Lin et al. |
| 2014/0009823 | A1 | 1/2014 | Park et al. |
| 2015/0098002 | A1* | 4/2015 | Wang ............ G02B 13/18 359/716 |
| 2015/0219806 | A1* | 8/2015 | Arbabi ............ G02B 5/1842 29/436 |
| 2016/0299337 | A1 | 10/2016 | Arbabi et al. |
| 2016/0306079 | A1 | 10/2016 | Arbabi et al. |
| 2017/0293141 | A1 | 10/2017 | Schowengerdt et al. |
| 2018/0045953 | A1 | 2/2018 | Fan et al. |
| 2019/0086683 | A1* | 3/2019 | Aieta ............ H01Q 15/10 |
| 2019/0154877 | A1* | 5/2019 | Capasso ............ G02B 1/002 |
| 2019/0162592 | A1* | 5/2019 | Khorasaninejad ........ G01J 3/00 |
| 2020/0096672 | A1* | 3/2020 | Yu ............ G02B 1/02 |
| 2020/0355913 | A1* | 11/2020 | Park ............ G02B 5/1809 |
| 2021/0286188 | A1 | 9/2021 | Rubin et al. |

FOREIGN PATENT DOCUMENTS

| | | |
|---|---|---|
| JP | 6925358 B2 | 8/2021 |
| SG | 11201804346 P | 11/2021 |
| WO | WO-2016/178740 A2 | 11/2016 |
| WO | WO-2017/079480 A1 | 5/2017 |
| WO | WO-2017/091738 A1 | 6/2017 |
| WO | WO-2017/182771 A1 | 10/2017 |

OTHER PUBLICATIONS

Supplementary information of Chen et al. ("Engineering the phase front of light with phase-change material based planar lenses", Sci Rep 5, 8660 (2015), Published Mar. 2, 2015). (Year: 2015).*

Aieta et al. "Aberration-Free Ultrathin Flat Lenses and Axicons at Telecom Wavelengths Based on Plasmonic Metasurfaces", Nano Lett. 2012, 12, 9, 4932-4936 (Year: 2012).*

Arbabi et al., "Miniature optical planar camera based on a wide-angle metasurface doublet corrected for monochromatic aberrations", Nature Communications vol. 7, Article No. 13682 (Year: 2016).*

Supplementary Figures of Arbabi et al., "Miniature optical planar camera based on a wide-angle metasurface doublet corrected for monochromatic aberrations", Nature Communications vol. 7, Article No. 13682 (Year: 2016).*

Khorasaninejad et al. "Metalenses at visible wavelengths: Diffraction-limited focusing and subwavelength resolution imaging", Science, Jun. 3, 2016, vol. 352, Issue 6290, pp. 1190-1194 (Year: 2016).*

Arbabi, A. et al., "Miniature optical planar camera based on a wide-angle metasurface doublet corrected for monochromatic aberrations", Nature Communications, vol. 7, Nov. 29, 2016, 18 pages.

International Search Report and Written Opinion for International Application No. PCT/US2018/031204, dated Jul. 23, 2018, 10 pages.

Khorasaninejad, M. et al., "Achromatic Metasurface Lens at Telecommunication Wavelengths", Nano Letters, vol. 15, No. 8; Jul. 13, 2015, pp. 5358-5362.

Khorasaninejad, M. et al., "Metalenses at visible wavelengths: Diffraction-limited focusing and subwavelength resolution imaging", Science, vol. 352, No. 6290; Jun. 3, 2016, pp. 1190-1194.

* cited by examiner

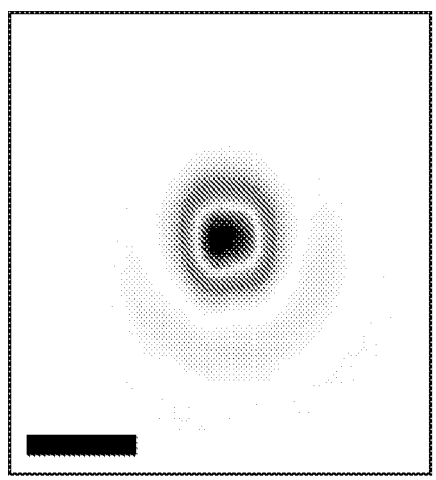
FIG. 3B
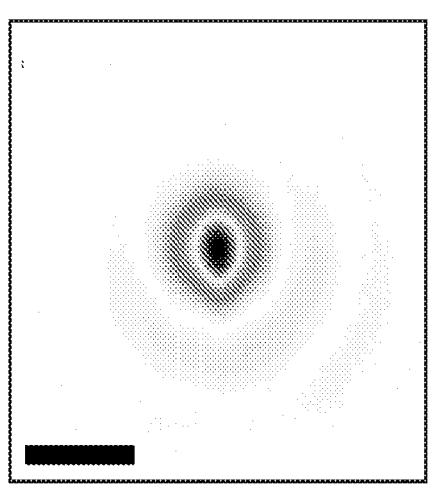
FIG. 3C
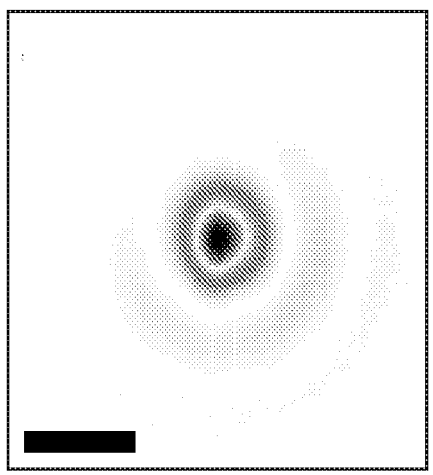
FIG. 3D
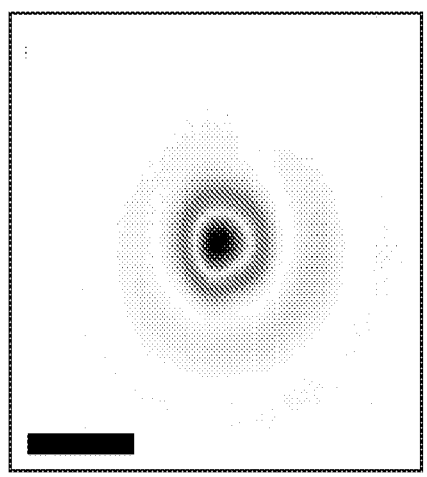
FIG. 3E
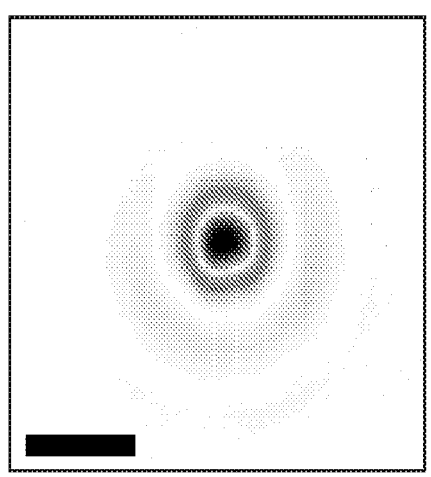
FIG. 3F
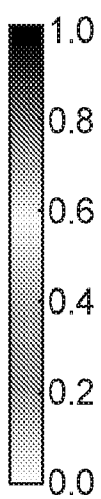

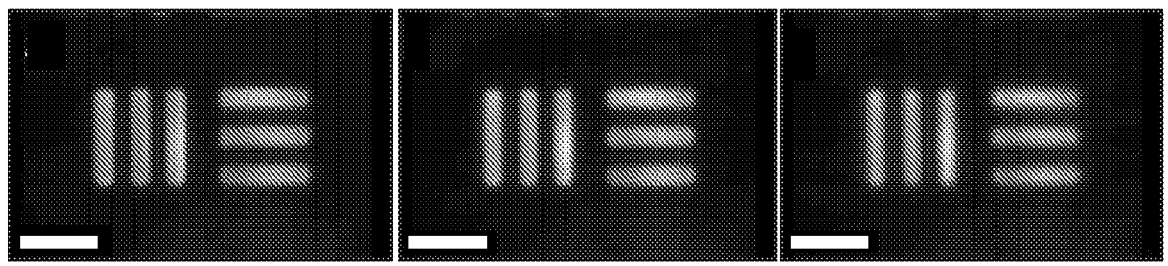
FIG. 5A    FIG. 5B    FIG. 5C
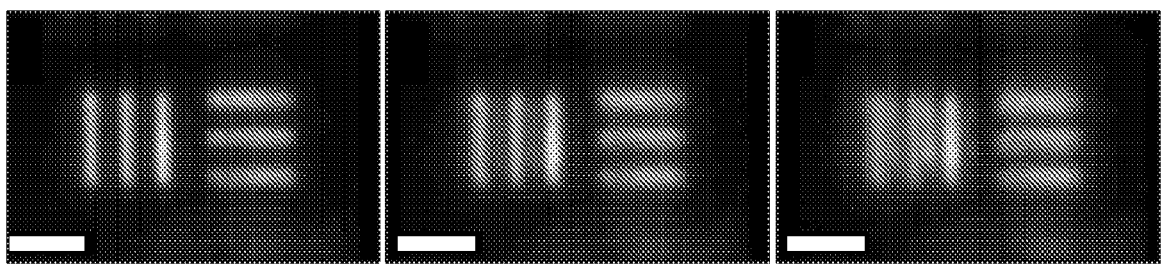
FIG. 5D    FIG. 5E    FIG. 5F
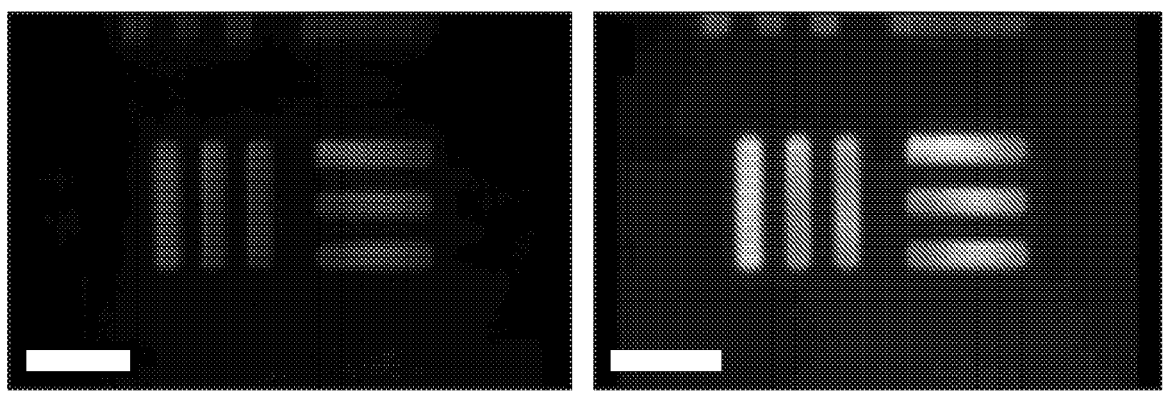
FIG. 5G    FIG. 5H
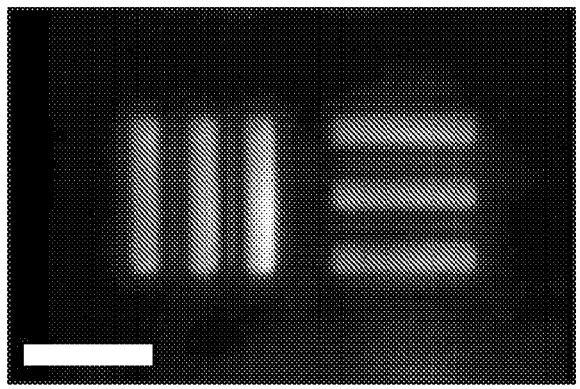
FIG. 5I    FIG. 5J

META-LENS DOUBLET FOR ABERRATION CORRECTION

CROSS-REFERENCE TO RELATED APPLICATIONS

This application is a National Stage Entry of International Application No. PCT/US2018/031204, filed on May 4, 2018, which claims the benefit of and priority to U.S. Provisional Patent Application 62/501,422, filed May 4, 2017, which is incorporated herein by reference in its entirety.

STATEMENT OF FEDERALLY SPONSORED RESEARCH OR DEVELOPMENT

This invention is made with Government support under FA9550-14-1-0389 and FA9550-16-1-0156, awarded by the Air Force Office of Scientific Research. The Government has certain rights in the invention.

BACKGROUND

In optics, a lens doublet is an optical device that includes two conventional lenses. The arrangement of two convention lenses involves determining parameters such as optical surfaces, thicknesses, formulations and the space between the lenses. A lens doublet may achieve a better imaging quality, compared to a singlet lens, by adjusting the parameters. However, the combination of two conventional lenses, together with conventional lens manufacturing techniques, results in a bulky and expensive optical system.

SUMMARY

In this disclosure, imaging systems that include multiple meta-lenses are disclosed. For example, according to at least some embodiments of the present disclosure, an imaging system includes a meta-lens doublet that improves imaging quality by aberration correction and diffraction-limited focusing. The meta-lens doublet may include two metasurfaces deposited on both sides of a substrate. In some other embodiments, a meta-lens doublet may include two metasurfaces deposited on two substrates. In other words, the meta-lenses of the doublet may share a substrate or may be separate to each other. The meta-lens doublet may allow diffraction-limited imaging along a focal plane at the visible spectrum (e.g., red, green and/or blue wavelengths (wavelength $\lambda$ of 660 nanometers (nm), 532 nm and/or 405 nm, respectively)). The compact and planar design of the meta-lens doublet allows a host of cost-effective solutions for versatile applications such as camera, microscopy, machine vision and computer vision.

As used herein, the term "meta-lens doublet" refers to an optical device including two meta-lenses or two metasurfaces. It is to be understood, however, optical devices according to various embodiments of the present disclosure may include various numbers of meta-lenses and/or metasurfaces. For example, an optical device may include more than two meta-lenses and/or metasurfaces.

As used herein, the term "visible spectrum" refers to wavelengths visible to humans. The term encompasses an entire range of wavelengths visible across the human population. It is to be understood, however, that this range will vary between specific humans. For example, the visible spectrum may encompass wavelengths from about 400 nm to about 700 nm. Additionally, the meta-lenses described herein may be optimized for certain subranges of the visible spectrum, or for certain ranges out of the visible spectrum (e.g., infrared (IR) or near infrared (NIR) spectrums).

In an aspect according to some embodiments, an optical device comprises a first meta-lens and a second meta-lens. The first meta-lens includes a first plurality of nanostructures that define a first phase profile of the first meta-lens. The second meta-lens includes a second plurality of nanostructures that define a second phase profile of the second meta-lens. A combination of the first meta-lens having the first phase profile and the second meta-lens having the second phase profile is configured to correct an aberration of light transmitted through the optical device. The optical device may also conduct a diffraction-limited focusing of the light.

In another aspect according to some embodiments, a meta-lens doublet comprises a substrate, a plurality of first nanostructures and a plurality of second nanostructures. The substrate has a first surface and a second surface opposite to the first surface. The plurality of first nanostructures are deposited or disposed on the first surface of the substrate. The plurality of second nanostructures are deposited or disposed on the second surface of the substrate. The first nanostructures and the second nanostructures together define a lens profile that corrects an aberration of light transmitting through the meta-lens doublet. The optical device may also conduct a diffraction-limited focusing of the light.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 3B illustrates an intensity profile of a focal spot of a meta-lens doublet for an incident angle.

FIG. 3C illustrates an intensity profile of a focal spot of a meta-lens doublet for an incident angle.

FIG. 3D illustrates an intensity profile of a focal spot of a meta-lens doublet for an incident angle.

FIG. 3E illustrates an intensity profile of a focal spot of a meta-lens doublet for an incident angle.

FIG. 3F illustrates an intensity profile of a focal spot of a meta-lens doublet for an incident angle.

FIG. 5A illustrates an image of a resolution target taken with a light source having a bandwidth.

FIG. 5B illustrates an image of a resolution target taken with a light source having a bandwidth.

FIG. 5C illustrates an image of a resolution target taken with a light source having a bandwidth.

FIG. 5D illustrates an image of a resolution target taken with a light source having a bandwidth.

FIG. 5E illustrates an image of a resolution target taken with a light source having a bandwidth.

FIG. 5F illustrates an image of a resolution target taken with a light source having a bandwidth.

FIG. 5G illustrates an image of a resolution target taken with a light source having a center wavelength.

FIG. 5H illustrates an image of a resolution target taken with a light source having a center wavelength.

FIG. 5I illustrates an image of a resolution target taken with a light source having a center wavelength.

FIG. 5J illustrates an image of a resolution target taken with a light source having a center wavelength.

DETAILED DESCRIPTION

Figure 1A:
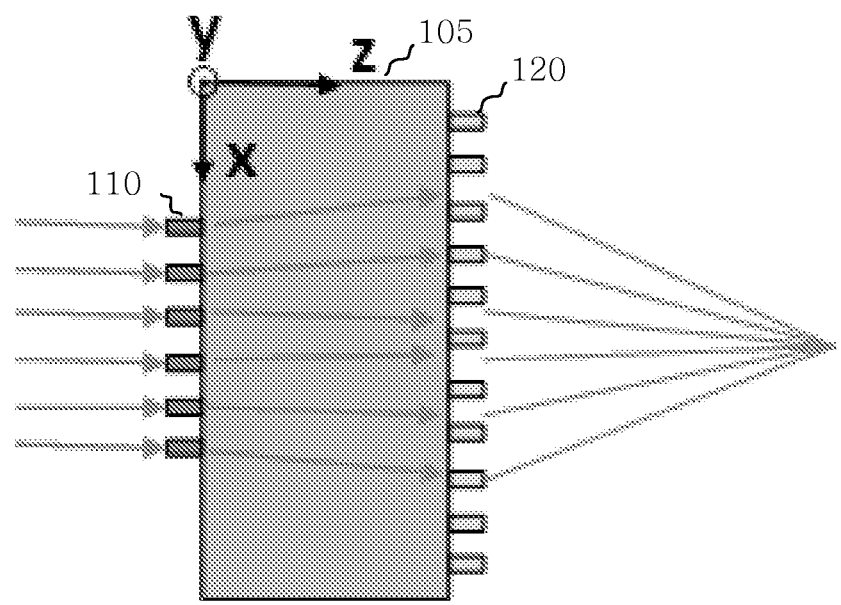
FIG. 1A schematically illustrates an example of a meta-lens doublet.

Conventional imaging devices include multiple conventional lenses that are bulky and expensive. The bulky and expensive compound lenses limit the type of applications that can implement using such conventional imaging devices and hinders their integration into compact and cost-effective systems.

Metasurfaces have emerged as a way of controlling light through optical properties of sub-wavelength structures patterned on a flat surface. The sub-wavelength structures are designed capable of locally changing the amplitudes, polarizations and/or phases of incident light beams for realizing various optical devices in a compact configuration. According to at least some embodiments of the present disclosure, to achieve a better spatial resolution, a meta-lens doublet includes two metasurfaces deposited on both sides of a substrate. The meta-lens doublet allows diffraction-limited focusing along a focal plane for an incident angle (also referred to as angle of incidence) up to, e.g., about 25°, about 50°, about 75 or about 90°. The meta-lens doublet corrects aberrations such as Petzval field curvature and coma aberration in the visible spectrum.

According to some embodiments, the meta-lens doublet includes an aperture meta-lens in front of a focusing meta-lens. The aperture meta-lens and the focusing meta-lens may share a substrate. In other words, the metasurfaces of the aperture meta-lens and the focusing meta-lens are deposited on two sides of the substrate. The light rays from normal incident angles and oblique incident angles (also referred to as normal incidences and oblique incidences, or normal angles of incidences and oblique angles of incidence) are separated by a small aperture of the aperture meta-lens and then focused by different parts of the focusing meta-lens such that the meta-lenses are tailored to reduce aberrations such as coma aberrations and/or spherical aberrations.

According to some embodiments, the meta-lens doublet includes a combination of at least two meta-lens. Each meta-lens includes nanoscale structures (also referred to as nanostructures) such as nano-fins or nano-pillars. The meta-lens doublet may be designed for a light source with a center wavelength of, e.g., about 532 nm. The meta-lens doublet may have a numerical aperture (NA) of at least about 0.44, about 0.5, about 0.6, about 0.7 or about 0.8. The meta-lens doublet may have a focal length of about 100 μm, about 260 μm, about 300 μm, about 340 μm, about 380 μm, about 420 μm, or about 1000 μm. The meta-lens doublet may have a field of view of about 30°, about 40°, about 50°, about 60°, about 70 or about 80°. The meta-lens doublet may achieve not only diffraction-limited focusing, but also high quality imaging along a focal plane. Unlike traditional lenses (e.g., Fresnel lenses), the use of nanostructures may provide additional degrees of freedom to engineer for correcting aberrations such as chromatic aberrations, coma aberrations, and/or spherical aberrations. In addition, the meta-lens doublet may be mass-produced by, e.g., deep ultraviolet lithography or nano-imprinting. The meta-lens doublet may be used in many applications such as microscopy, spectroscopy, computer vision, machine vision, cellphones, cameras, portable computers, virtual reality devices, augmented reality devices, and other devices.

Structures of Meta-Lens Doublet

FIG. 1A schematically illustrates an example of a meta-lens doublet, according to some embodiments of the present disclosure. The meta-lens doublet 100 includes a substrate 105, an aperture meta-lens 110 and a focusing meta-lens 120. The aperture meta-lens 110 and the focusing meta-lens 120 are deposited on two sides of the substrate 105. The substrate 105 may be, e.g., a glass (e.g., silicon dioxide ($SiO_2$)) substrate having thickness of from about 0.2 millimeters (mm) to about 0.6 mm, from about 0.1 mm to about 1 mm, from about 0.05 mm to about 2 mm, or from about 0.01 mm to about 5 mm.

In some embodiments, each of the aperture meta-lens 110 and the focusing meta-lens 120 includes an array of nano-fins with different rotations (or other types of nanoscale structures). The nano-fins may be formed of, or include, e.g., titanium dioxide ($TiO_2$). In some embodiments, in addition to $TiO_2$, the nanostructures may include other suitable dielectric materials including those having a light transmittance over the visible spectrum of at least about 40%, at least about 50%, at least about 60%, at least about 70%, at least about 80%, at least about 85%, at least about 90%, or at least about 95%. For example, other suitable dielectric materials can be selected from oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., $TiO_2$)), nitrides (such as nitrides of silicon (e.g., $Si_3N_4$), boron (e.g., BN), or tungsten (e.g., WN)), sulfides and pure elements. The lengths, widths, and heights of the nano-fins may be substantially the same among the nano-fins of the same meta-lens 110 or 120. In some embodiments, the rotations (also referred to as orientations) of the nano-fins may be different.

Figure 1B:
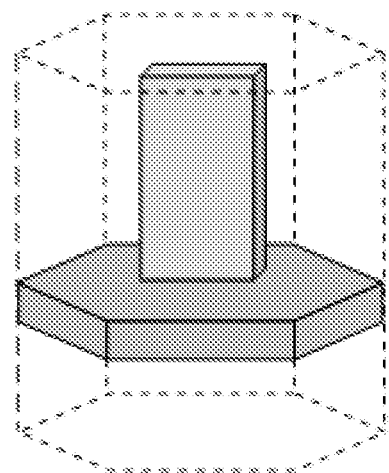
FIG. 1B schematically illustrates a perspective view of a nano-fin.

FIG. 1B schematically illustrates a perspective view of a nano-fin, according to some embodiments of the present disclosure. In some embodiments, each nano-fin may be deposited on, e.g., a unit cell of a hexagonal lattice. It is to be understood, however, the nano-fins or other nanoscale structures (also referred to as nanostructures) may be deposited on any types of lattices (e.g., square or rectangular lattices), according to various embodiments of the present disclosure.

Figures 1C, 1D, 1E:
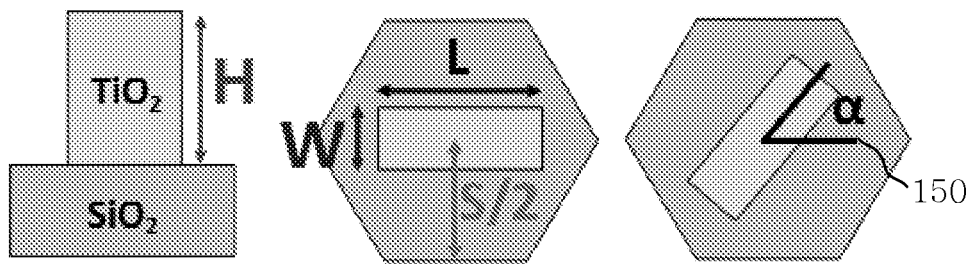
FIG. 1C schematically illustrates a side view of a nano-fin.
FIG. 1D schematically illustrates a top view of a nano-fin arranged in an orientation.
FIG. 1E schematically illustrates a rotation angle of a nano-fin relative to an axis parallel to a substrate.

FIG. 1C schematically illustrates a side view of a nano-fin, according to some embodiments of the present disclosure. FIG. 1D schematically illustrates a top view of a nano-fin arranged in an orientation. As shown in FIGS. 1C and 1D, the nano-fin has a height of H, a width of W and a length of L. The lattice constant for each hexagonal unit cell is S. In some embodiments, the dimensions of the nano-fins are W=about 95 nanometers (nm), L=about 250 nm, H=about 600 nm, and S=about 320 nm.

FIG. 1E schematically illustrates a rotation angle α of a nano-fin relative to an axis 150 parallel to a substrate, according to some embodiments of the present disclosure. A phase profile φ(x,y) is imparted through the rotations of nano-fins. The phase may be determined based on, e.g., the principles of Berry phase. In some embodiments, the use of Berry phase provides more precise control of the phase profile, and allows diffraction-limited focusing and polarization sensitivity. The relations between phases φ(x,y) and rotation angles α(x,y) follow: φ(x,y)=2 α(x,y), for the case of, e.g., left-handed circularly polarized (LCP) light. In some embodiments, the phase $\varphi_{AL}(x,y)$ of a light transmitted through a nano-fin of the aperture meta-lens 110 at a location (x,y) may be determined as following:

$$\varphi_{AL}(x, y) = \sum_{n=1}^{5} a_n \left(\frac{\rho}{R_{AL}}\right)^{2n}. \quad (1)$$

Similarly, in some embodiments, the phase $\varphi_{FL}(x,y)$ of a light transmitted through a nano-fin of the focusing meta-lens 120 at a location (x,y) may be determined as following:

$$\varphi_{FL}(x, y) = \frac{2\pi}{\lambda_d}\left(\sqrt{x^2 + y^2 + f^2} - f\right) + \sum_{n=1}^{5} b_n \left(\frac{\rho}{R_{FL}}\right)^{2n}. \quad (2)$$

Here, $\lambda_d$ is a design wavelength (e.g., 532 nm), f is a focal length (e.g., 342.3 micrometers (μm)), $\rho=\sqrt{x^2+y^2}$ is the radial coordinate, x and y are position coordinates of each nano-fin with respect to an origin at the center of each meta-lens, $R_{AL}$ is the radius of the aperture meta-lens 110, and $R_{FL}$ is the radius of the focusing meta-lens 120. Although the equations (1) and (2) shows n=5, it is to be understood that n may be any integer number according to various embodiments of the present disclosure.

In some embodiments, the phase profiles of equations (1) and (2) may be determined for LCP and RCP (right-handed circularly polarized) light. In some embodiments, the meta-lens doublet is polarization-sensitive. In some other embodiments, the meta-lens doublet is polarization-insensitive.

The first term of Equation (1) is a hyperbolic term. A meta-lens with a phase profile including the hyperbolic term, without the second polynomial term of Equation (2), may be referred to as a hyperbolic meta-lens.

In some embodiments, the equations (1) and/or (2) for the aperture meta-lens 110 and/or focusing meta-lens 120 may include a polynomial (in addition to the hyperbolic term) for correcting aberrations. The coefficients $\alpha_n$ and $b_n$ of the polynomials may be, e.g., optimization parameters. In some embodiments, these optimization parameters may be determined by, e.g., a ray-tracing algorithm. For example, the optimization parameters may be determined such that all light rays for various incident angles fall within a diffraction-limited Airy disk. The range of the incident angles may be, e.g., up to about 25°, up to about 30°, up to about 45°, or up to about 60°. The term "Airy disk" refers to a focused spot of light limited by diffraction of light. Table 1 lists sample values of $R_{AL}$ and $\alpha_n$, according to at least one embodiment. Table 2 lists sample values of $R_{FL}$ and $b_n$, according to at least one embodiment.

TABLE 1

Phase profile coefficients of an aperture meta-lens

| | $R_{AL}$ (μm) | $a_1$ | $a_2$ | $a_3$ | $a_4$ | $a_5$ |
|---|---|---|---|---|---|---|
| aperture meta-lens | 156.41968 | −13.5078 | 22.5578 | −5.3161 | 6.8526 | −2.1028 |

TABLE 2

| | Phase profile coefficients of a focusing meta-lens | | | | | |
|---|---|---|---|---|---|---|
| | $R_{FL}$ (µm) | $b_1$ | $b_2$ | $b_3$ | $b_4$ | $b_5$ |
| focusing meta-lens | 321.4889 | 4.9531 | −15.8389 | 2.9388 | −0.0589 | −0.00167 |

Figure 1F:
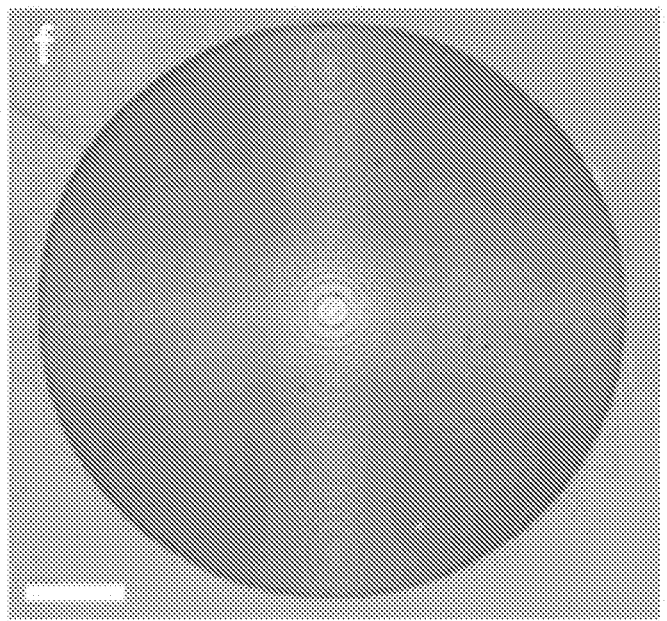
FIG. 1F illustrates an optical microscope image of an example of a focusing meta-lens.
Figure 1G:
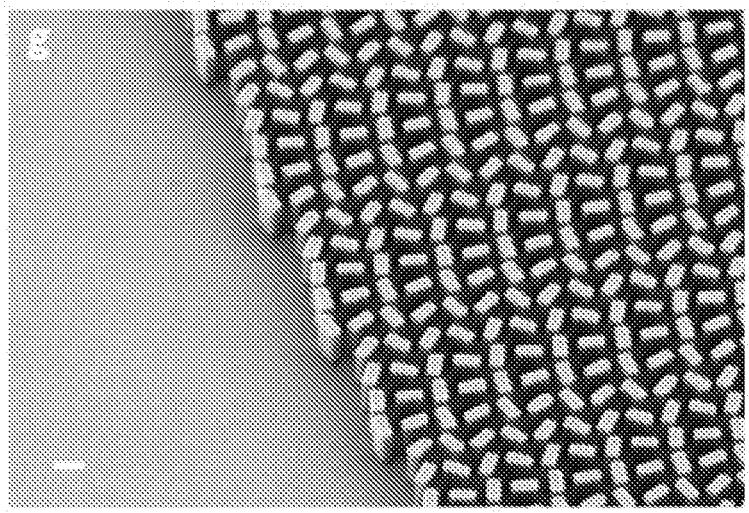
FIG. 1G illustrates a scanning electron microscope (SEM) image of an example of a portion of a focusing meta-lens at an edge of the meta-lens.

In some embodiments, both the aperture meta-lens and focusing meta-lens 110 and 120 may be fabricated by, e.g., electron beam lithography followed by atomic layer deposition. The meta-lenses 110 and 120 may be aligned through, e.g., alignment marks patterned on both sides of the substrate 105. FIG. 1F illustrates an optical microscope image of an example of a focusing meta-lens, according to some embodiments of the present disclosure. The scale bar shown on FIG. 1F may have a length of, e.g., 40 µm. FIG. 1G illustrates a scanning electron microscope (SEM) image of an example of a portion of a focusing meta-lens at an edge of the meta-lens. The scale bar shown on FIG. 1G may have a length of, e.g., 300 nm.

Figure 1H:
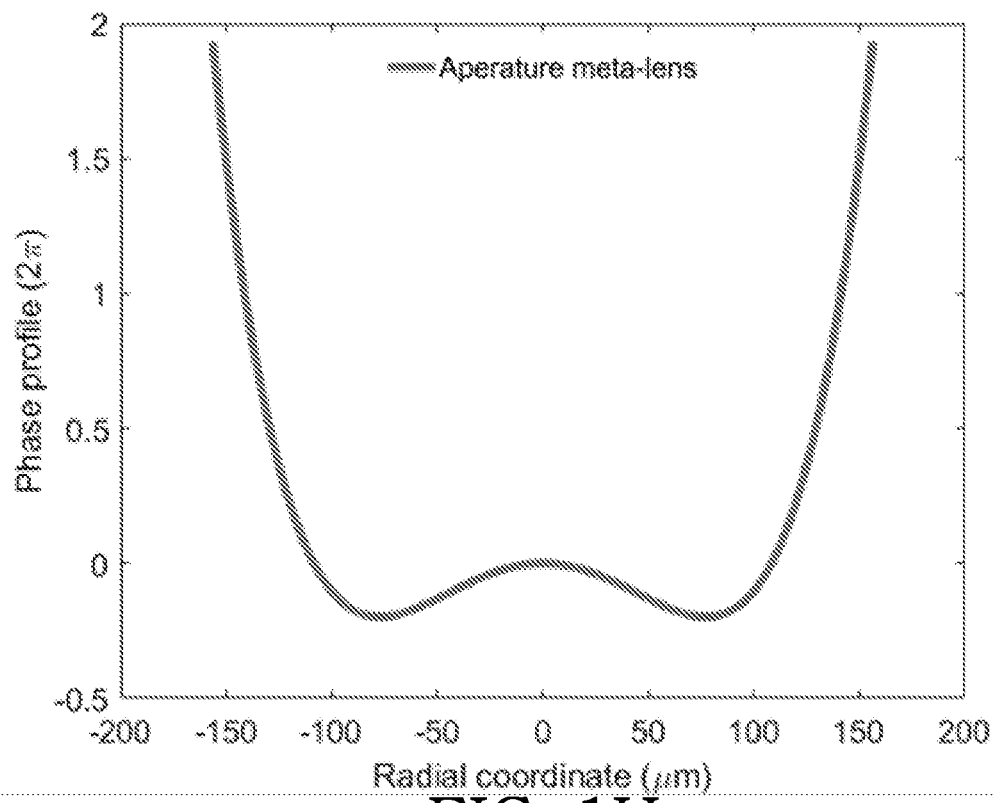
FIG. 1H illustrates phase as a function of radial coordinate for an aperture meta-lens.

FIG. 1H illustrates a plot of phases versus radial coordinates for an aperture meta-lens, according to some embodiments of the present disclosure. The phase profile 170 of the aperture meta-lens may be based on, e.g., Equation (1). The phase profile 170 of the aperture meta-lens as illustrated in FIG. 1H may result in converging chief rays and diverging marginal rays. The chief rays refer to the rays that are in the middle of a ray pattern and the marginal rays refer to the rays that are at the margins of the ray pattern. The phase profile 170 of the aperture meta-lens may correct positive and/or negative spherical aberrations, and may be similar to, e.g., a phase profile of a Schmidt plate.

Figure 1I:
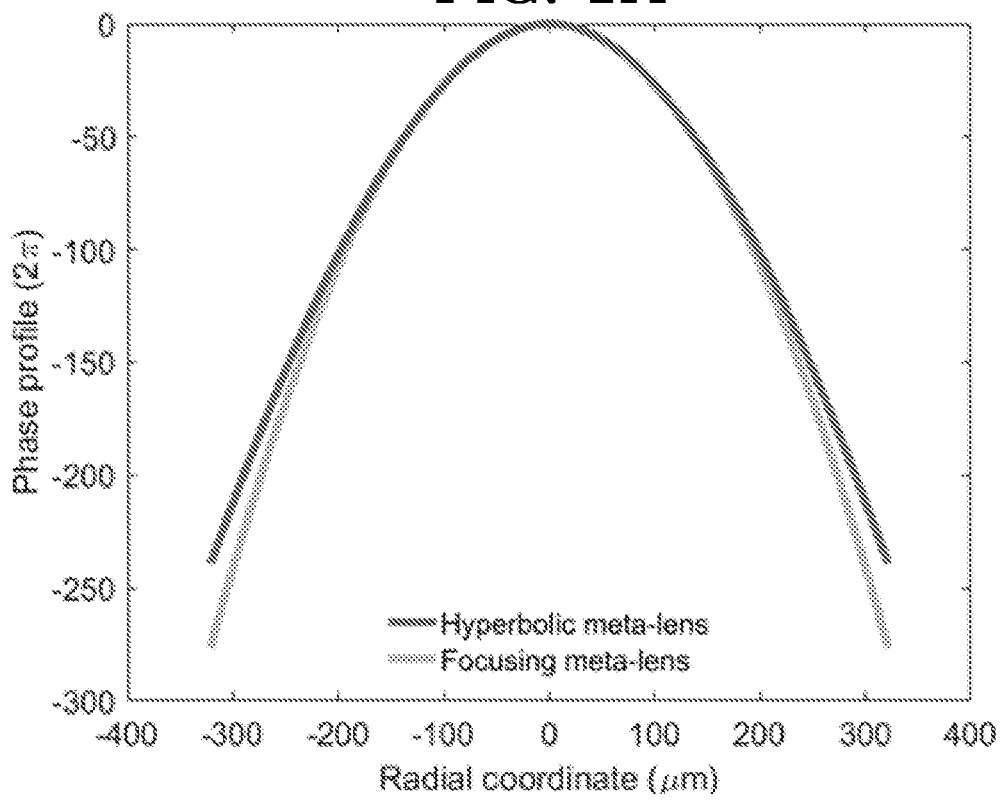
FIG. 1I illustrates phases as functions of radial coordinate for a focusing meta-lens and a hyperbolic meta-lens.

FIG. 1I illustrates plots of phases versus radial coordinates for a focusing meta-lens and a hyperbolic meta-lens, according to some embodiments of the present disclosure. The phase profile 190 of the focusing meta-lens may be based on, e.g., Equation (2). The phase profile 180 of the hyperbolic meta-lens may be based on, e.g., a hyperbolic phase profile that corresponds to the first hyperbolic term of Equation (2), but without the second polynomial term of Equation (2).

As illustrated in FIG. 1I, in comparison, the phase profile 190 of the focusing meta-lens has a stronger phase gradient at the edge than the phase profile 180 of the hyperbolic meta-lens.

Aberration Correction by Meta-Lens Doublet

Figure 2A:
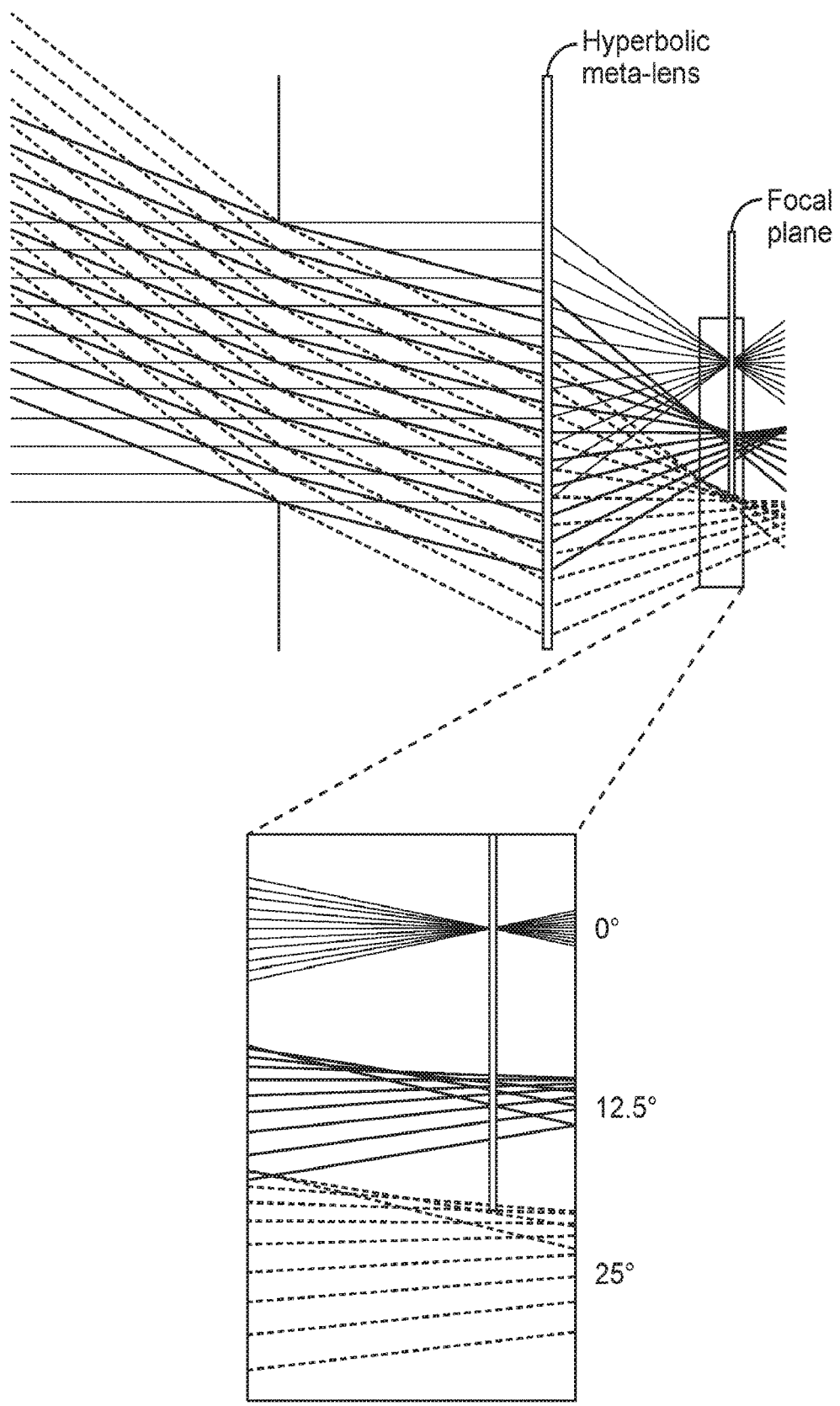
FIG. 2A illustrates a ray diagram for a hyperbolic meta-lens.

FIG. 2A illustrates a ray diagram for a hyperbolic meta-lens, according to some embodiments of the present disclosure. In some embodiments, the hyperbolic meta-lens may merely achieve diffraction-limited focusing at normal incidence. The inset of FIG. 2A illustrates a magnified view of the rays near a focal plane of the meta-lens. At oblique incidences, the light rays suffer strong aberrations. In other words, the phase profile of a hyperbolic meta-lens shows large aberrations at, at least, oblique incidences. Without changing the hyperbolic phase profile of the hyperbolic meta-lens, adding another meta-lens as correction lens may not correct the aberrations. It is because the ray diagrams for different angles of incidence are significantly different, as shown in the inset of FIG. 2A.

Figure 2B:
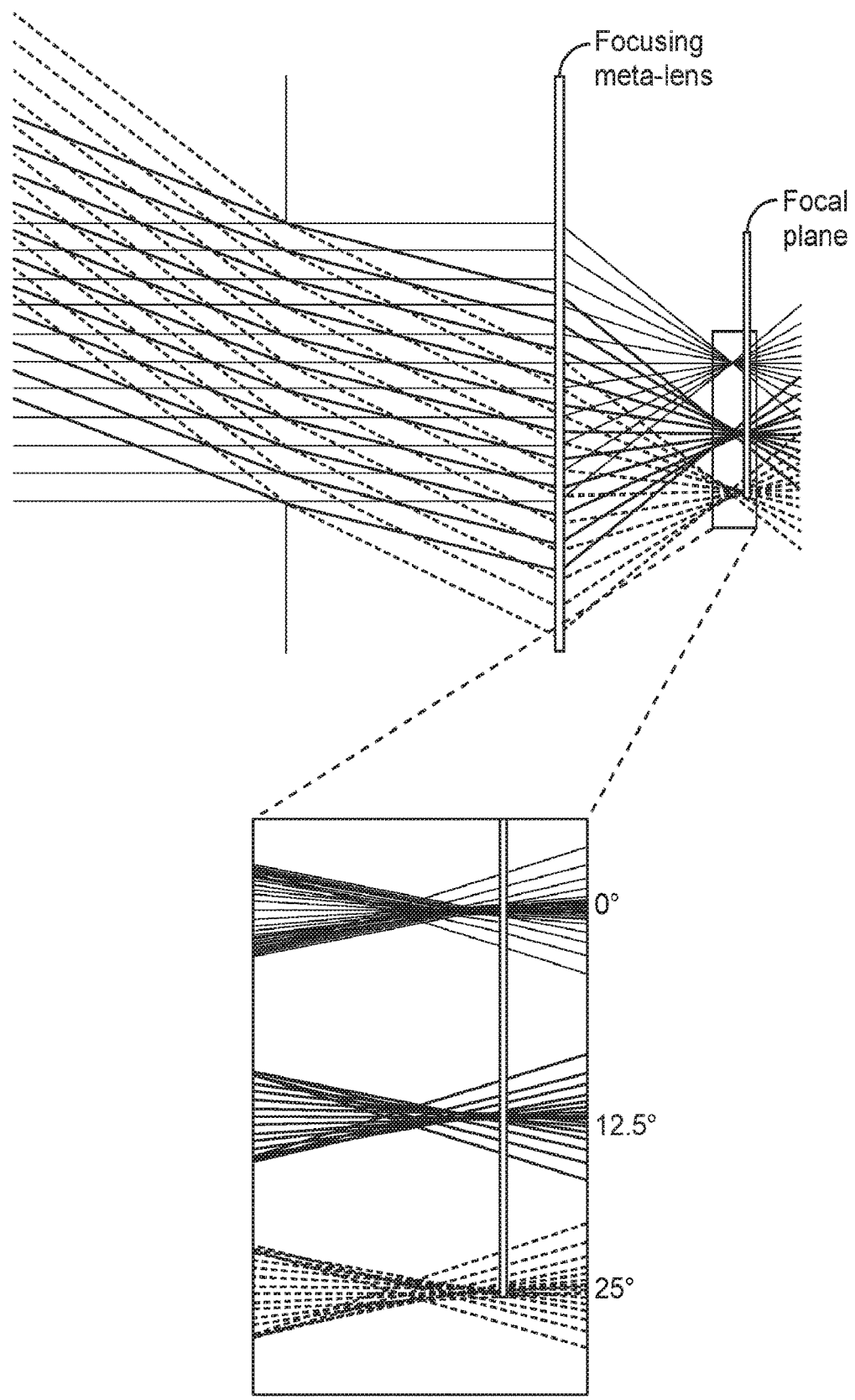
FIG. 2B illustrates a ray diagram for a focusing meta-lens without an aperture meta-lens.

FIG. 2B illustrates a ray diagram for a focusing meta-lens without an aperture meta-lens, according to some embodiments of the present disclosure. The inset of FIG. 2B illustrates a magnified view of the rays near the focal plane. The phase profile of the focusing meta-lens results in diffraction-limited focusing along an optical axis perpendicular to the focal plane. Because of the focusing meta-lens achieves stronger phase gradient at the edge of the meta-lens than the hyperbolic meta-lens (as illustrated in FIG. 1I), at least some of the marginal rays are bent more towards the optical axis than the chief rays and focus before reaching the focal plane (e.g., focus in front of the focal plane). The phenomenon that occurs for the marginal rays is referred to as positive spherical aberration. In contrast, at least some of the chief rays are bent less and focus after reaching the focal plane (e.g., focus behind the focal plane). The phenomenon that occurs for the chief rays is referred to as negative spherical aberration.

Figure 2C:
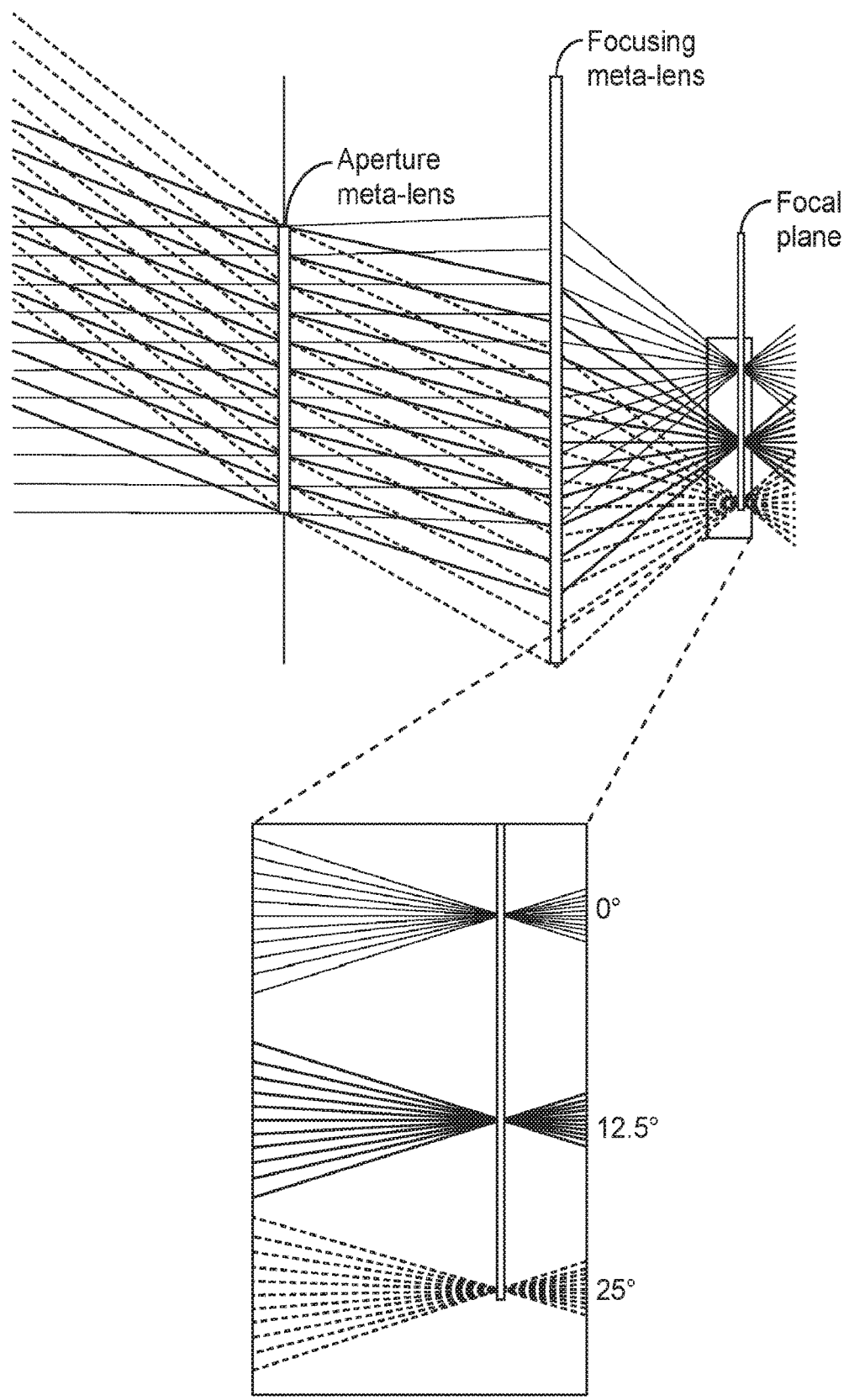
FIG. 2C illustrates a ray diagram for a meta-lens doublet including a focusing meta-lens and an aperture meta-lens.

The phase profile of the focusing meta-lens, as illustrated in FIG. 2B, results in diffraction-limited focusing of the rays along the optical axis perpendicular to the focal plane, as well as ray diagrams for rays of different incident angles that are similar to each other. The similarity of ray diagrams for incident angles may allow a possibility of correcting the aberrations. FIG. 2C illustrates a ray diagram for a meta-lens doublet including a focusing meta-lens and an aperture meta-lens, according to some embodiments of the present disclosure. The inset of FIG. 2C illustrates a magnified view of the rays near the focal plane. As illustrated in FIG. 2C, due to the existence of the aperture meta-lens, the positive and/or negative spherical aberrations may be corrected and the diffraction-limited focusing may be realized at the focal plane.

Figure 2D:
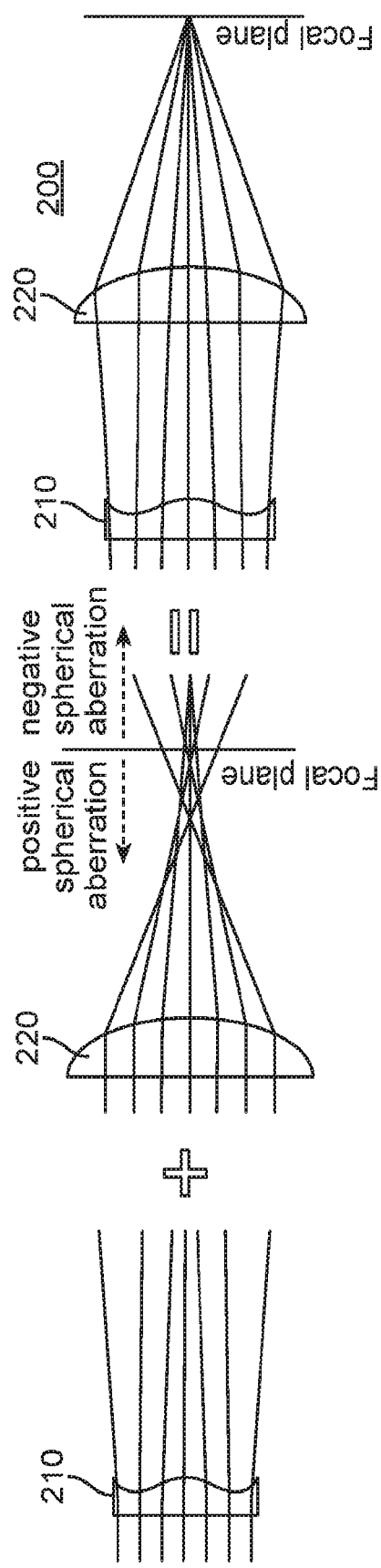
FIG. 2D illustrates aberration corrections by a meta-lens doublet including a focusing meta-lens and an aperture meta-lens.

FIG. 2D illustrates aberration corrections by a meta-lens doublet 200 including a focusing meta-lens 220 and an aperture meta-lens 210, according to some embodiments of the present disclosure. The focusing meta-lens 220, which performs like an aspherical lens, bends the rays in a way such that rays of different incident angles are focused at an optical axis of the meta-lens doublet 200. The aperture meta-lens 210, which performs like a Schmidt plate, further corrects the positive and/or negative spherical aberrations in such a way that marginal rays are diverged and chief rays are converged. In other words, the aperture meta-lens 210 increases an effective focal length for the marginal rays and decreases an effective focal length for the chief rays. As a result, the meta-lens doublet 200 allows aberration correction and diffraction-limited focusing at the focal plane. Unlike the bulky conventional optical components such as aspherical lens and Schmidt plate, the focusing meta-lens 220 and the aperture meta-lens 210 include nanoscale structures and may achieve compact configurations.

Characterization of Meta-Lens Doublet

Figure 3A:
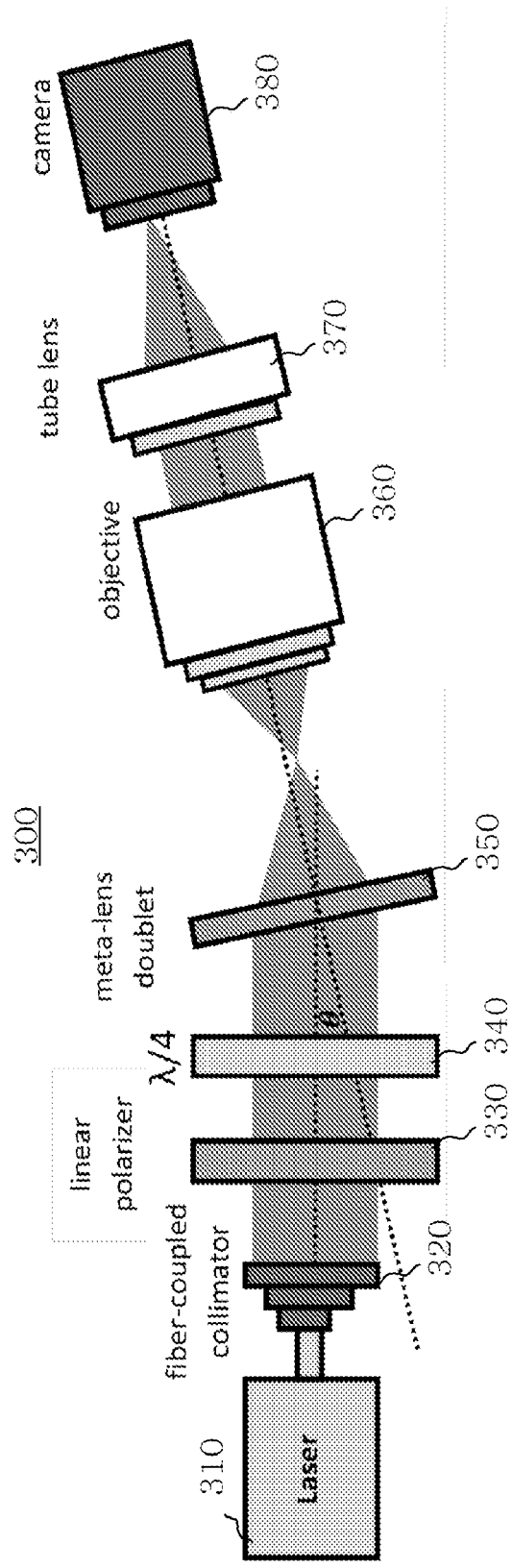
FIG. 3A schematically illustrates an experimental setup for characterizing a meta-lens doublet.

FIG. 3A schematically illustrates an experimental setup for characterizing a meta-lens doublet, according to some embodiments of the present disclosure. The setup 300 may include, e.g., a laser 310, a fiber-coupled collimator 320, a linear polarizer 330, a quarter wave plate 340, a meta-lens doublet 350, an objective lens 360 (also simply referred to as objective), a tube lens 370, and a camera 380. The setup 300 may measure, e.g., sizes of focal spots of the meta-lens doublet 350 for different angles of incidence.

For example, in some embodiments, an objective 360 of numerical aperture (NA)=about 0.95 and a tube lens 370 (f=about 180 mm) may be used to magnify the focal spot by, e.g., about 100 times on a camera with a pixel size of, e.g., about 2.2 µm. The meta-lens doublet 350, the objective 360, the tube lens 370 and camera 380 may be mounted on a rail (not shown) to adjust the angle of incidence. The light source may be, e.g., laser 310 having a center wavelength of about 532 nm. The bandwidth of the laser 310 may be, e.g., about 30 GHz (28 picometers (µm)), which means chromatic aberrations may be neglected.

Figure 3G:
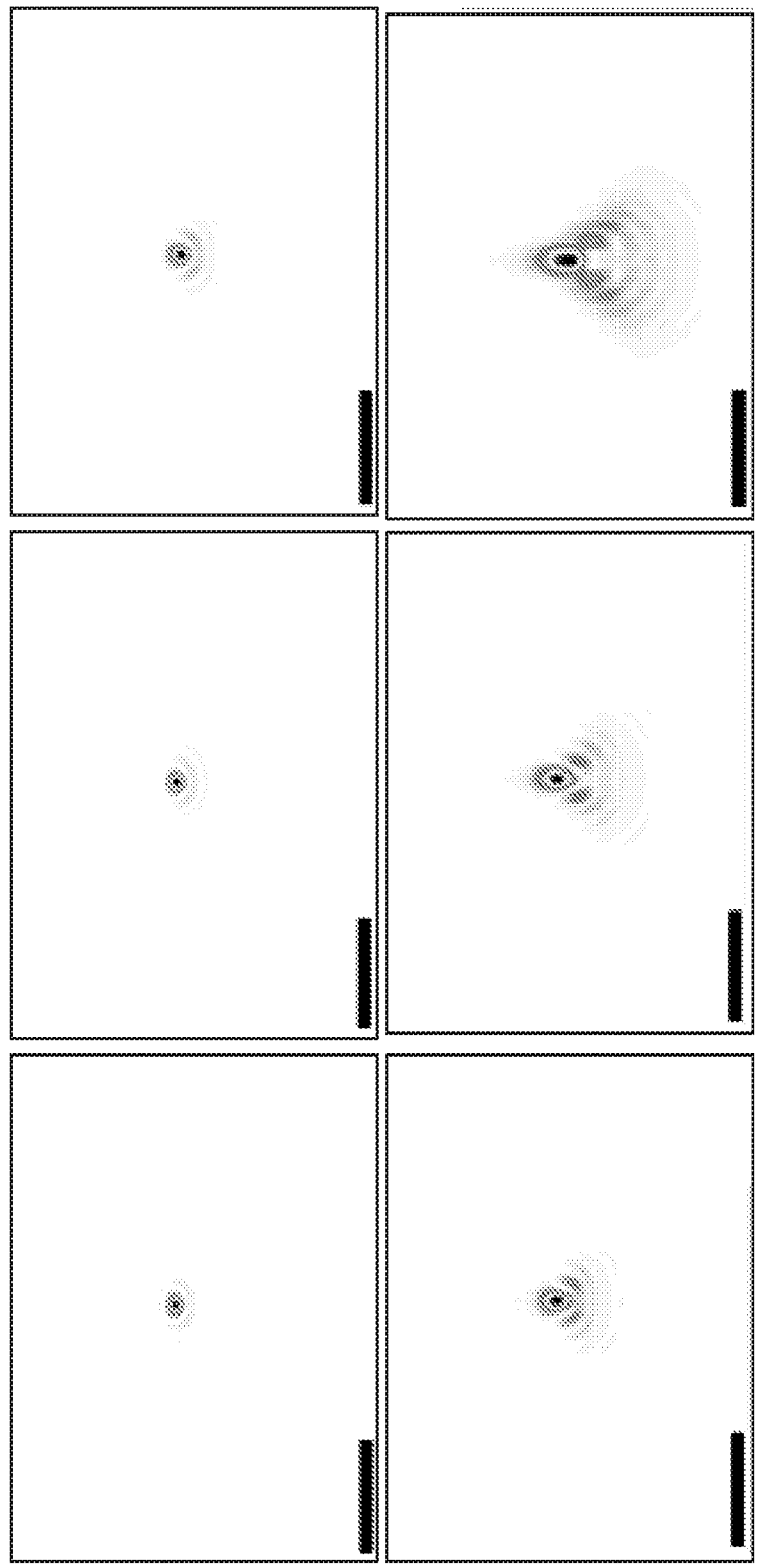
FIG. 3G illustrates intensity profiles of focal spots of a meta-lens doublet for various incident angles.

FIGS. 3B-3F respectively illustrate intensity profiles of focal spots of a meta-lens doublet for incident angles of about 0°, 6°, 12°, 18°, and 25°, according to some embodiments of the present disclosure. The scale bars shown on FIGS. 3B-3F may have a length of, e.g., about 1.1 µm. FIG. 3G illustrates intensity profiles of focal spots achieved by a meta-lens doublet for incident angles of about 25°, 30°, 35°, 40°, 450 and 50°, according to some embodiments of the present disclosure. The scale bars shown in FIG. 3G may have a length of, e.g., about 5 µm.

Figure 3H:
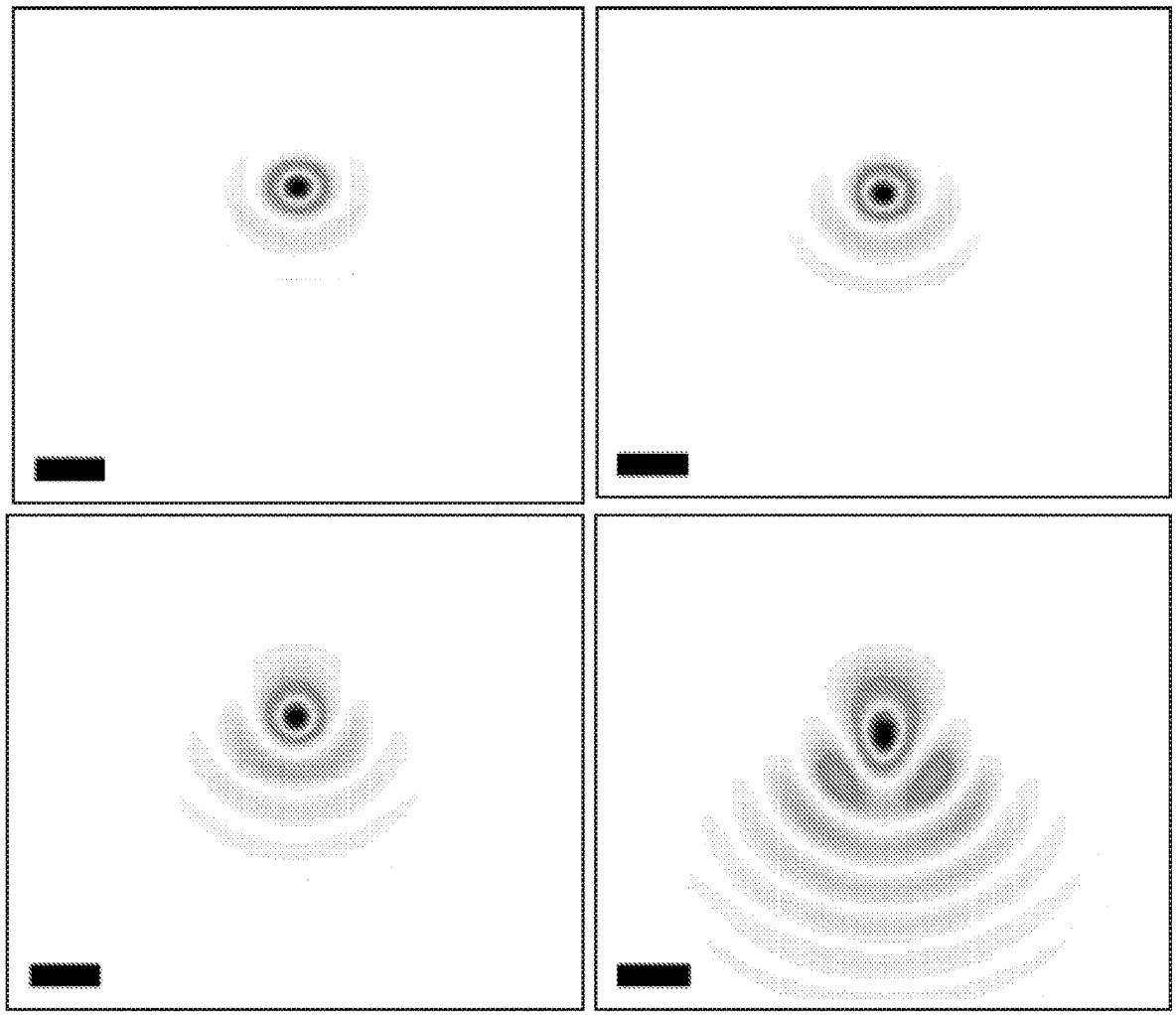
FIG. 3H illustrates deformed focal spots from light of normal incidence due to misalignment between an aperture meta-lens and a focusing meta-lens.

In some embodiments, a slight misalignment of the aperture meta-lens and the focusing meta-lens may result in slightly deformed focal spots. FIG. 3H illustrates deformed focal spots from light of normal incidence due to misalignment between an aperture meta-lens and a focusing meta-lens, according to some embodiments of the present disclosure. The misalignments are respectively about 2.5 m, about 5 m, about 10 m, and about 20 m. The scale bars shown in FIG. 3H have a length of, e.g., about 1.1 m.

Figure 3I:
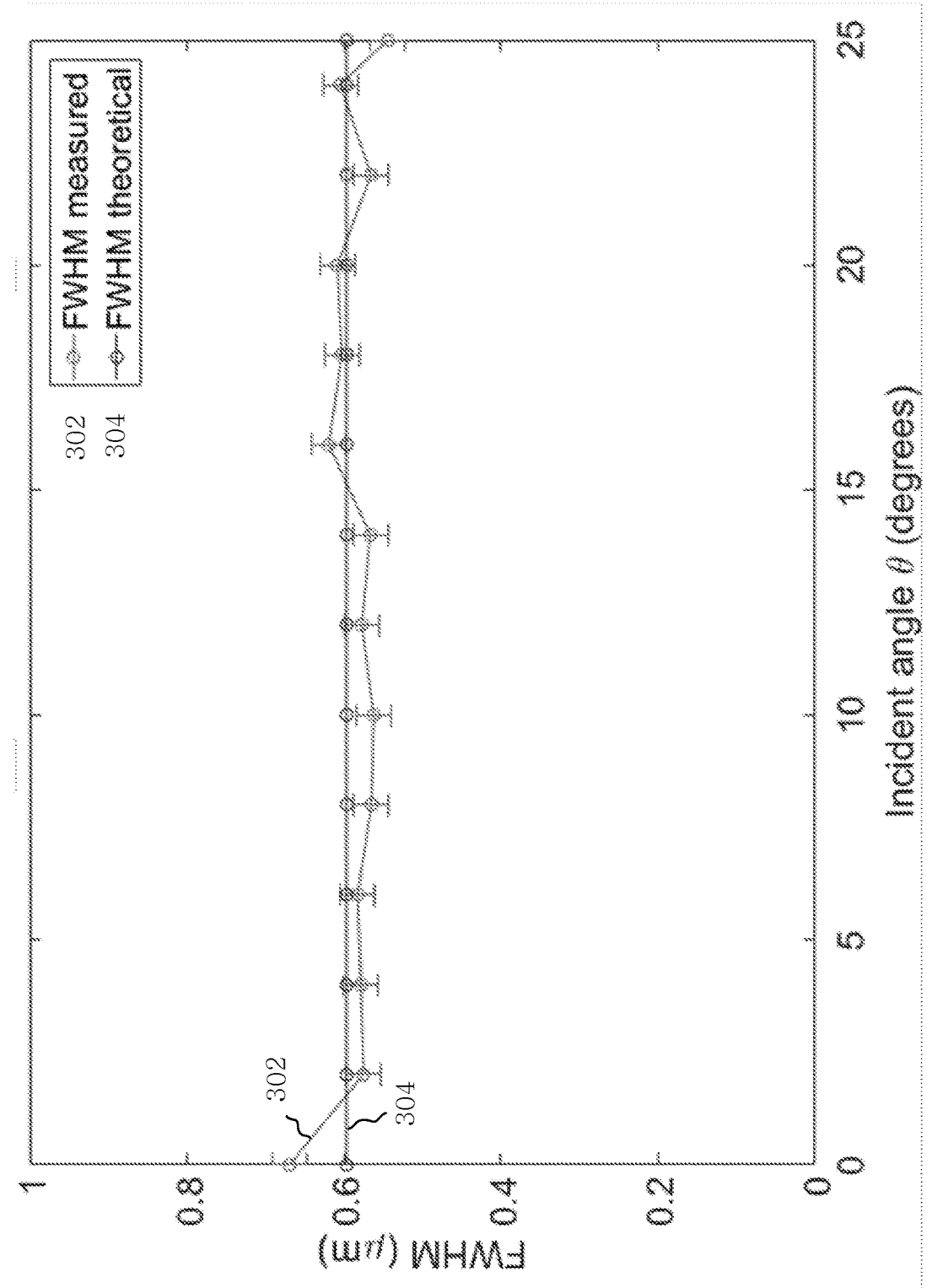
FIG. 3I illustrates full-widths at half maximum (FWHMs) of focal spots along a horizontal direction measured for different incident angles.
Figure 3J:
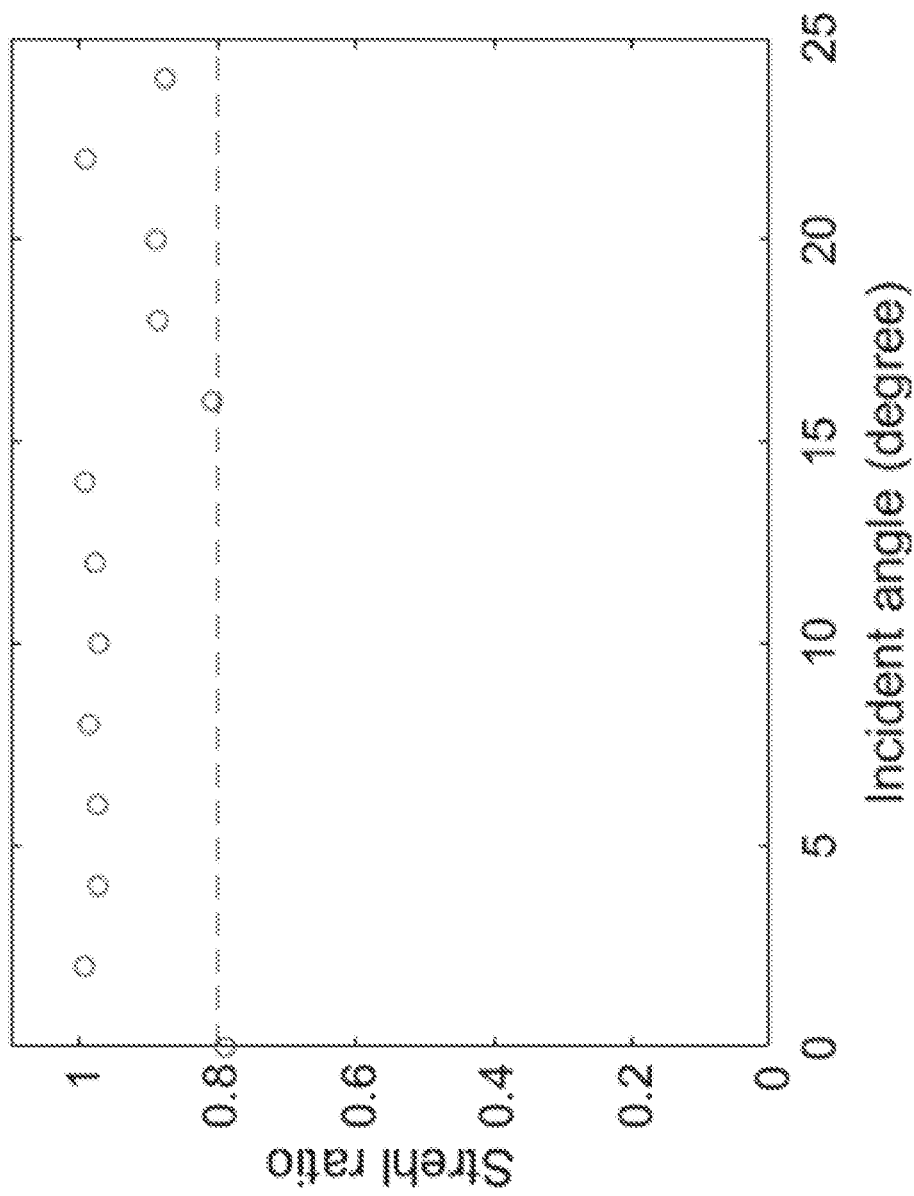
FIG. 3J illustrates Strehl ratios of focal spots for light from different incident angles.

FIG. 3I illustrates full-widths at half maximum (FWHMs) of the focal spots along a horizontal direction $$\sim \frac{\lambda_d}{2 \cdot NA}$$

measured for these incident angles up to, e.g., about 25°, according to some embodiments of the present disclosure. The line 302 includes the FWHMs as measured, comparing to the line 304 that includes the FWHMs as theoretically predicted. The Strehl ratios of the focal spots may be approximately or larger than about 0.8, which meets the specification of diffraction-limited focusing. For example, FIG. 3J illustrates Strehl ratios of the focal spots for light of about 532 nm for different incident angles, according to some embodiments of the present disclosure. Slight deviations between the measured FWHMs and the theoretically predicted FWHMs may arise from slight misalignment between the aperture meta-lens and the focusing meta-lens, as well as finite camera pixel size.

Figure 3K:
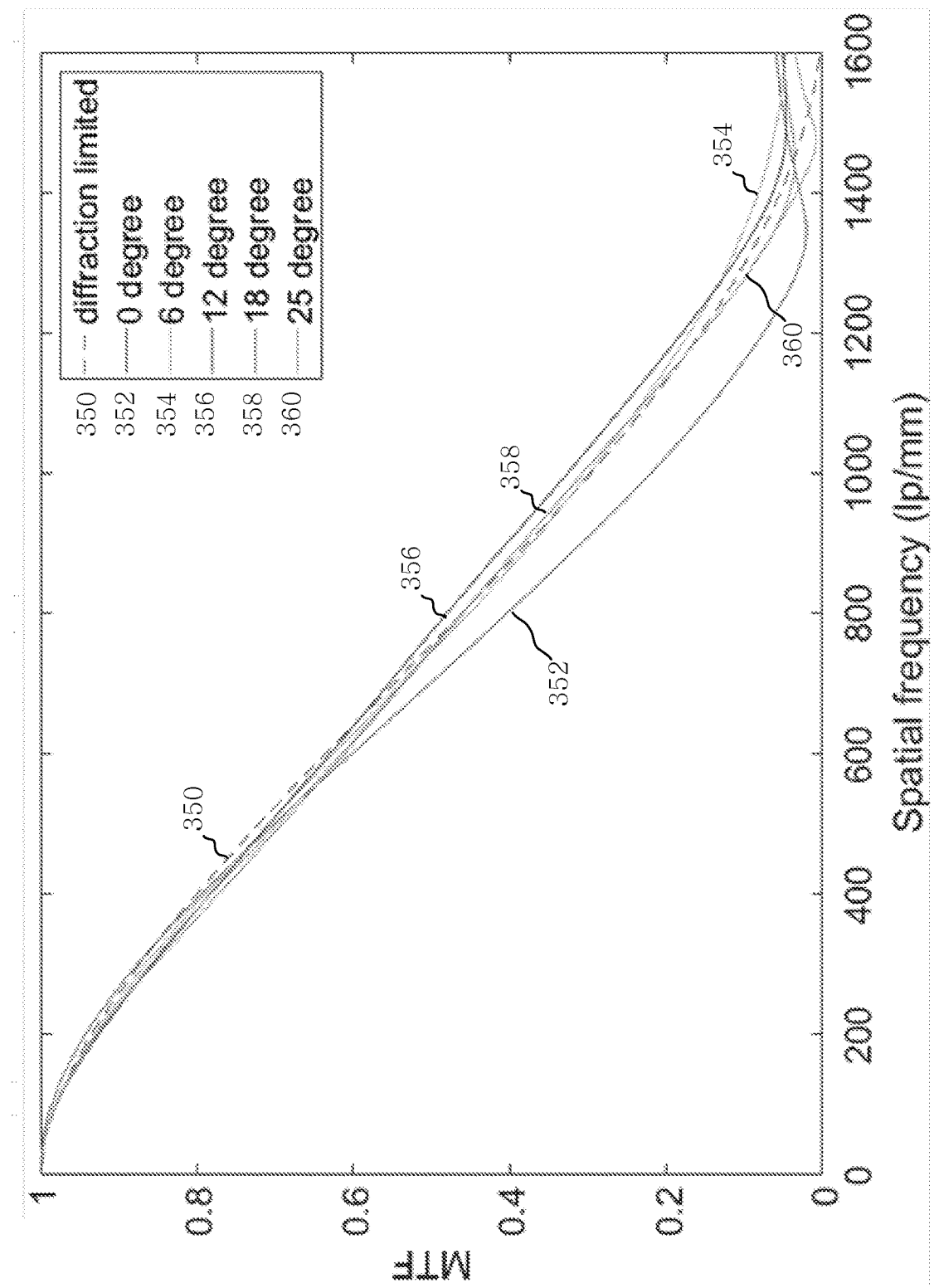
FIG. 3K illustrates modulation transfer functions (MTFs) measured along a horizontal direction for different incident angles.

FIG. 3K illustrates modulation transfer functions (MTFs) measured along a horizontal direction for different incident angles, according to some embodiments of the present disclosure. The MTF curves 352, 354, 356, 358 and 360 are respectively measured for incident angles of about 0°, 6°, 12°, 18°, and 25°. The MTF curve 360 is a diffraction-limited MTF curve as a reference. An MTF curve represents a maximum achievable intensity contrast for sinusoidal grating with different spatial frequencies. The peak-to-peak distance of the sinusoidal grating divided by a millimeter is defined as the spatial frequency. In some embodiments, the MTF may be obtained by performing a discrete Fourier transformation of the focal spot along a direction parallel to the incident plane. In general, the MTF value declines at larger spatial frequency, representing a cut-off corresponding to about $$\frac{2NA}{\lambda_d},$$

and a spatial frequency corresponding to a value of, e.g., about 0.1, which is usually referred to the resolution limit of the optical device.

Figure 4A:
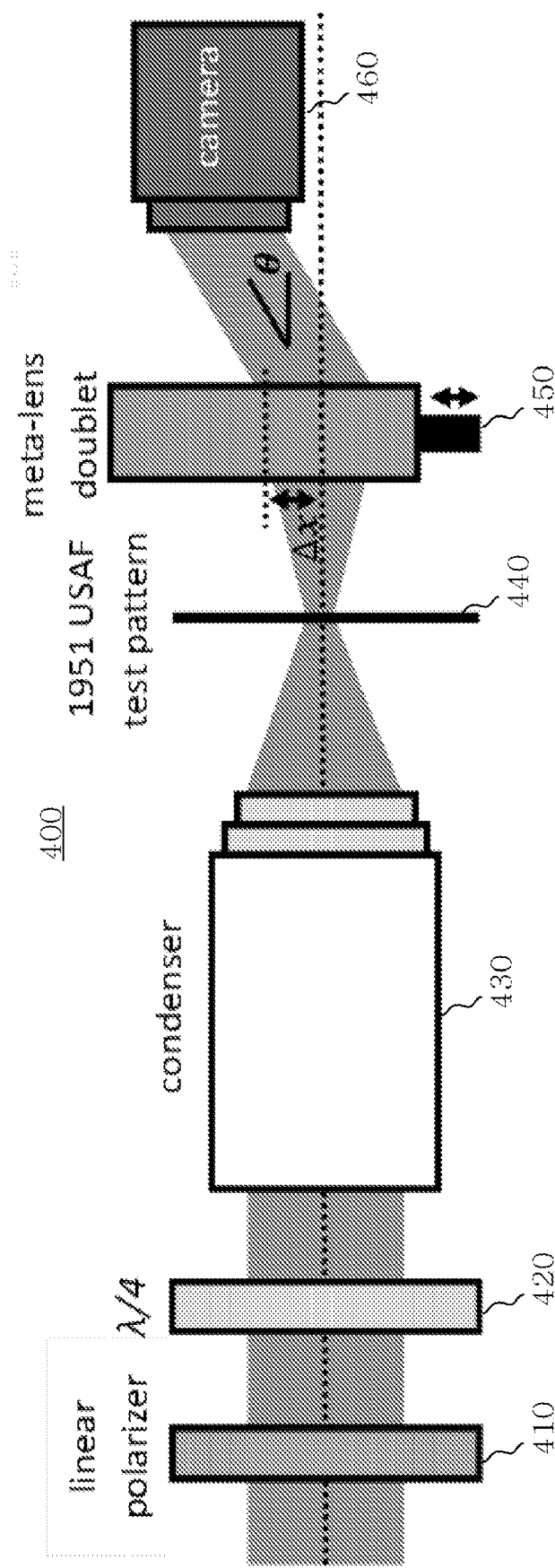
FIG. 4A schematically illustrates an experimental setup for widefield imaging of a metal-lens doublet.

In some embodiments, the meta-lens doublet may be used for widefield imaging. FIG. 4A schematically illustrates an experimental setup for widefield imaging, according to some embodiments of the present disclosure. The imaging target may be, e.g., element 6 in group 7 of 1951 US Air Force resolution target. The setup 300 may include, e.g., a linear polarizer 410, a quarter wave plate 420, a condenser 430, a resolution target 440, a meta-lens doublet 450, and a camera 460. The resolution target 440 (e.g., a 1951 US Air Force test pattern) is placed at a focal plane of the meta-lens doublet 450. In some embodiments, to reduce laser speckle, a supercontinuum laser (not shown) having a center wavelength of, e.g., about 532 nm and a bandwidth of, e.g., about 5 nm may be used as a light source. The resolution target 440 may include, e.g., stripe groups. Each strip group may include, e.g., three vertical bars and three horizontal bars with equal line widths and gaps. The line width may be, e.g., about 2.2 µm.

FIGS. 4B-4H illustrate images of a resolution target taken by moving a meta-lens doublet various steps away from an optical axis relative to a center of the resolution target, according to some embodiments of the present disclosure. The scale bars in FIGS. 4B-4H have a length of, e.g., about 11 µm. A size of the steps may be, e.g., about 25.4 µm. In other words, from the image of FIG. 4B to the image of FIG. 4H, the meta-lens doublet 450 is moved in steps of 25.4 µm away from the optical axis to characterize the image quality. The different numbers of steps may correspond to different fields of view of the meta-lens doublet 450. In some other embodiments, the step size may be, e.g., about 1 µm, about 5 µm, about 10 µm, about 25 µm, about 50 µm, or about 100 µm.

Figure 4B:
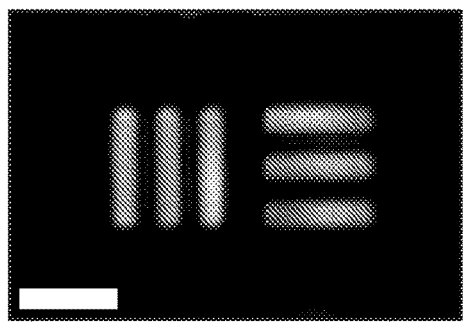
FIG. 4B illustrates an image of a resolution target taken by placing a meta-lens doublet at an optical axis relative to a center of the resolution target.
Figure 4C:
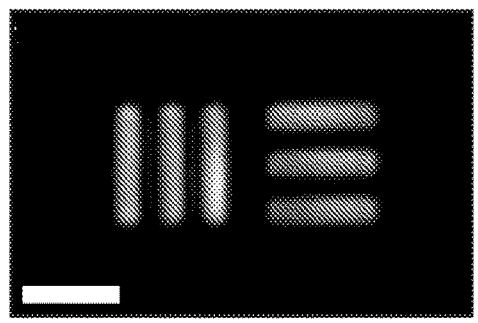
FIG. 4C illustrates an image of a resolution target taken by moving a meta-lens doublet away from an optical axis relative to a center of the resolution target.
Figure 4D:
FIG. 4D illustrates an image of a resolution target taken by moving a meta-lens doublet away from an optical axis relative to a center of the resolution target.
Figure 4E:
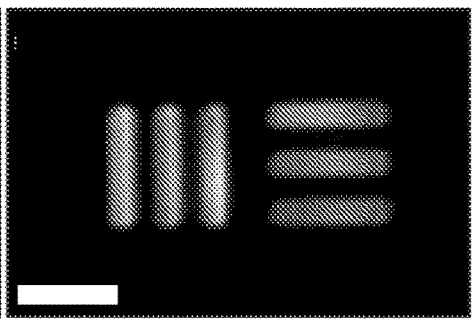
FIG. 4E illustrates an image of a resolution target taken by moving a meta-lens doublet away from an optical axis relative to a center of the resolution target.
Figure 4F:
FIG. 4F illustrates an image of a resolution target taken by moving a meta-lens doublet away from an optical axis relative to a center of the resolution target.
Figure 4G:
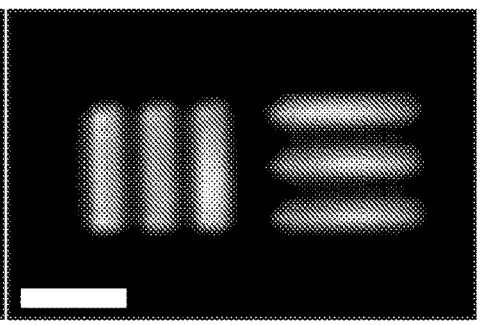
FIG. 4G illustrates an image of a resolution target taken by moving a meta-lens doublet away from an optical axis relative to a center of the resolution target.
Figure 4H:
FIG. 4H illustrates an image of a resolution target taken by moving a meta-lens doublet away from an optical axis relative to a center of the resolution target.
Figure 4I:
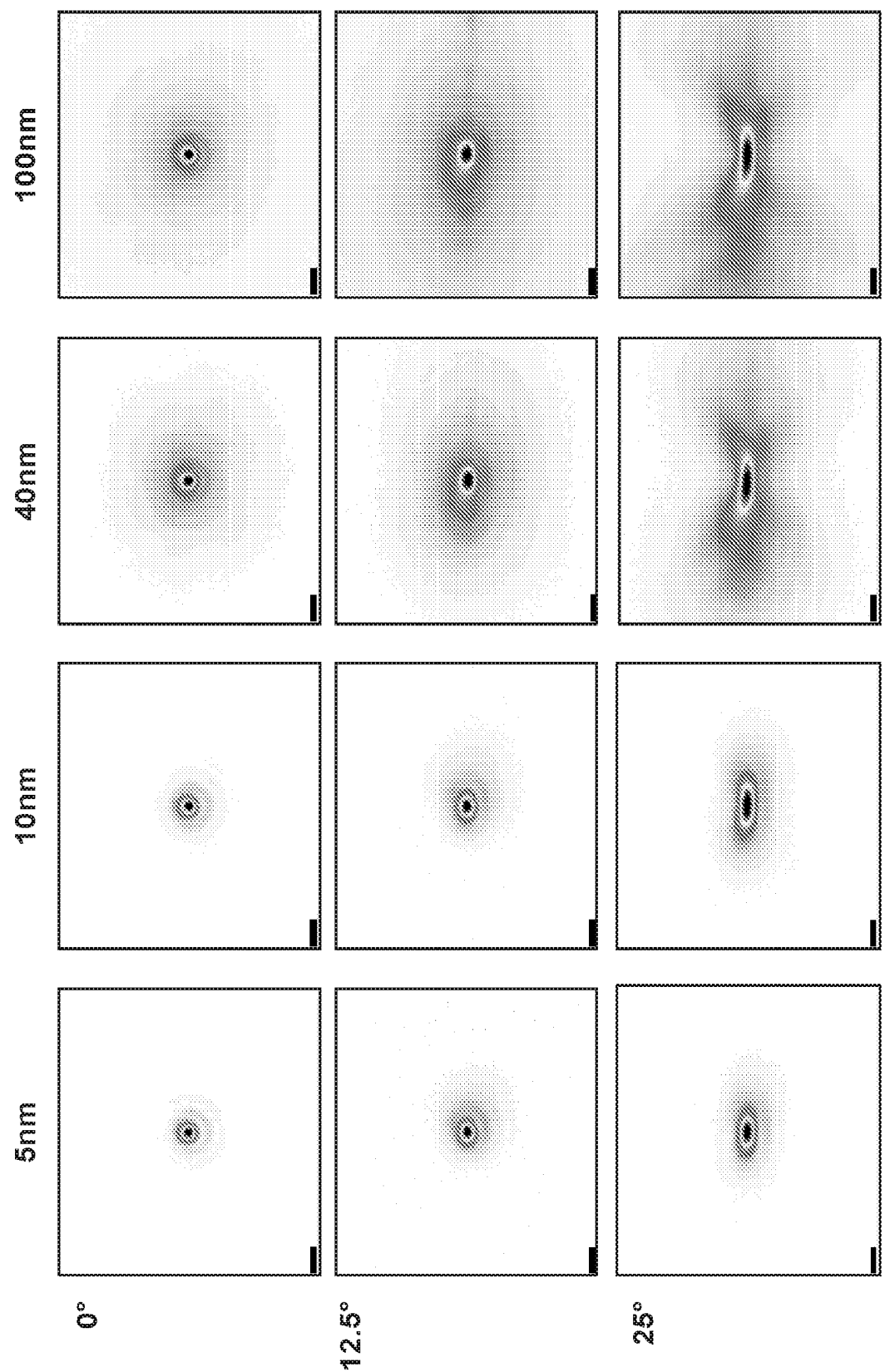
FIG. 4I illustrates intensity profiles of focal spots for light of various angles of incidence and various bandwidths.

Each movement 4x of the meta-lens 450 corresponds to a different angle of incidence θ. In particular, FIG. 4B is an image taken by placing the meta-lens 450 at the optical axis (a movement Δx of 0 µm and an incident angle θ of about 0). FIG. 4C is an image taken by moving the meta-lens 450 by a movement Δx of about 25.4 µm and with an incident angle θ of about 4.11°. FIG. 4D is an image taken by moving the meta-lens 450 by a movement Δx of about 50.8 µm and with an incident angle θ of about 8.26°. FIG. 4E is an image taken by moving the meta-lens 450 by a movement Δx of about 76.2 µm and with an incident angle θ of about 12.48°. FIG. 4F is an image taken by moving the meta-lens 450 by a movement Δx of about 101.6 µm and with an incident angle θ of about 16.83°. FIG. 4G is an image taken by moving the meta-lens 450 by a movement Δx of about 127 µm and with an incident angle of about 21.33°. FIG. 4H is an image taken by moving the meta-lens 450 by a movement Δx of about 152.4 µm and with an incident angle θ of about 26.05°.

Figure 4J:
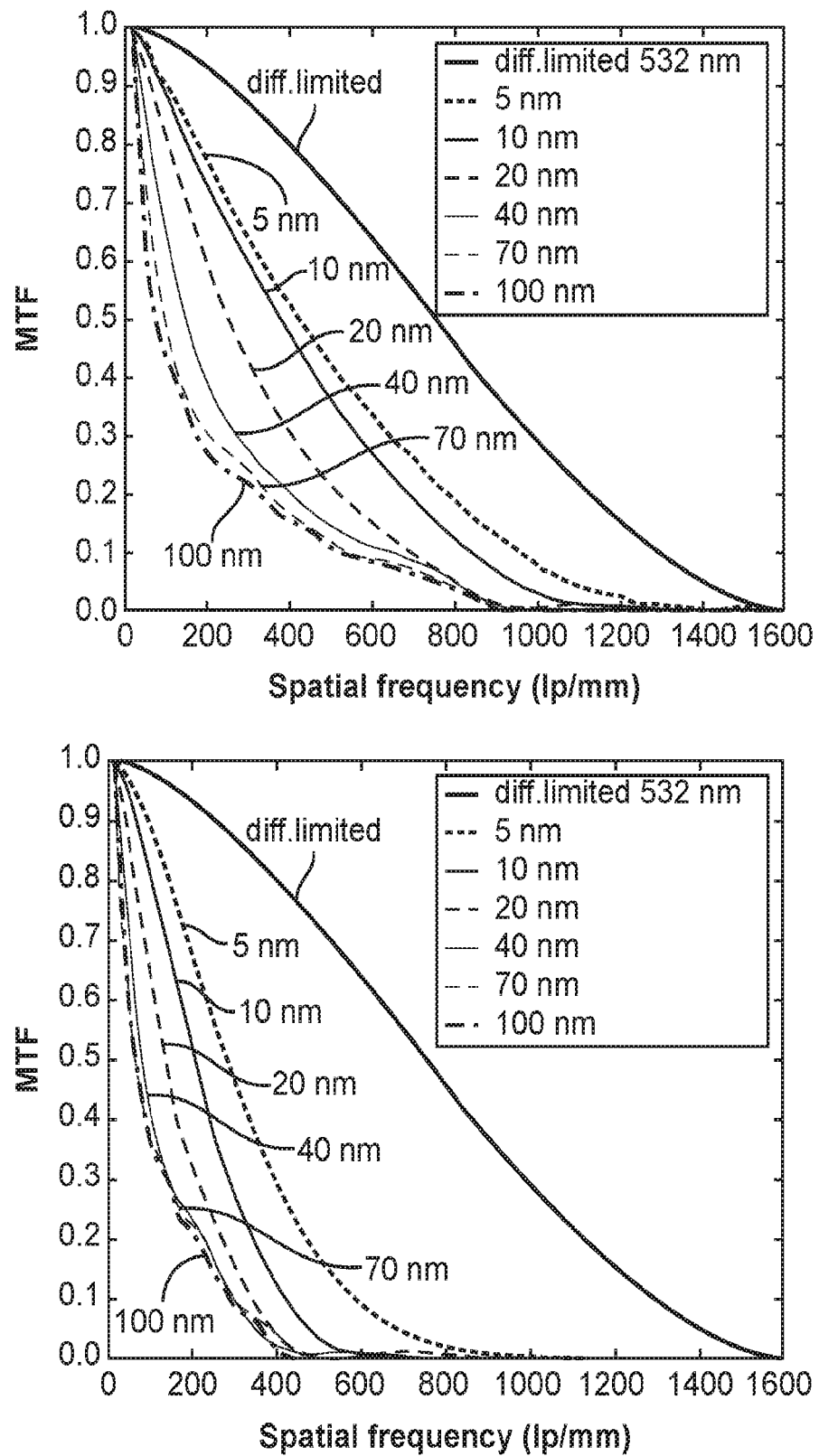
FIG. 4J illustrates MTFs for light of various angles of incidence and various bandwidths.

In some embodiments, the horizontal bars may be blurred because chromatic aberrations are more significant at larger angles of incidence. For example, FIG. 4 illustrates intensity profiles of focal spots for light of various angles of incidence and various bandwidths, according to some embodiments of the present disclosure. The light source may have a center wavelength of, e.g., about 532 nm. The scale bars shown in FIG. 4I may have a length of, e.g., about 1.1 µm. FIG. 4J illustrates MTFs for light of various angles of incidence at (A) 12.5° and (B) 25 and various bandwidths, according to some embodiments of the present disclosure.

FIGS. 5A-5F illustrate images of a resolution target taken with light sources having different bandwidths, according to some embodiments of the present disclosure. The resolution target may be placed such that the light rays leave the resolution target and enter the meta-lens doublet in a normal incident angle. The light source may be, e.g., a tubular laser having a center wavelength of about 532 nm with different bandwidths. In particular, for the images of FIGS. 5A, 5B, 5C, 5D, 5E and 5F, the light source bandwidth may be about 5 nm, about 10 nm, about 20 nm, about 40 nm, about 70 nm and about 100 nm respectively. The scale bars in FIGS. 5A-5F may have a length of, e.g., 11 µm.

FIGS. 5G-5J illustrate images of a resolution target taken with light sources having different wavelengths, according to some embodiments of the present disclosure. For example, for the images of FIGS. 5G-5J, the light sources may have the same bandwidth but different center wavelengths. In particularly, for the images of FIGS. 5G, 5H, 5I and 5J, the center wavelength of the light source may be about 470 nm, about 490 nm, about 580 nm and about 660 nm respectively. The scale bars in FIGS. 5G-5J may have a length of, e.g., 11 µm.

Figure 5K:
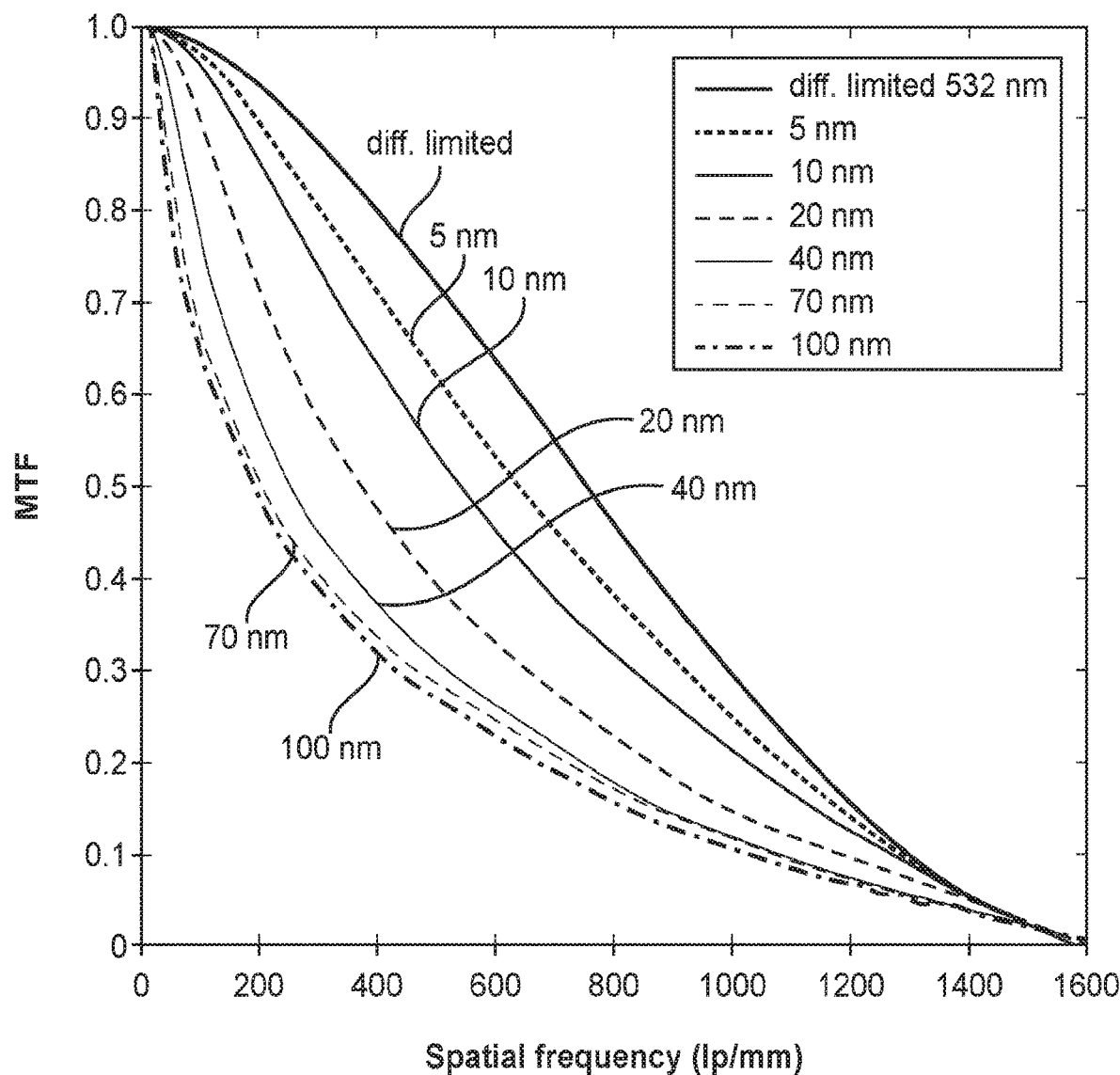
FIG. 5K illustrates MTF curves for light having different bandwidths.
Figure 5L:
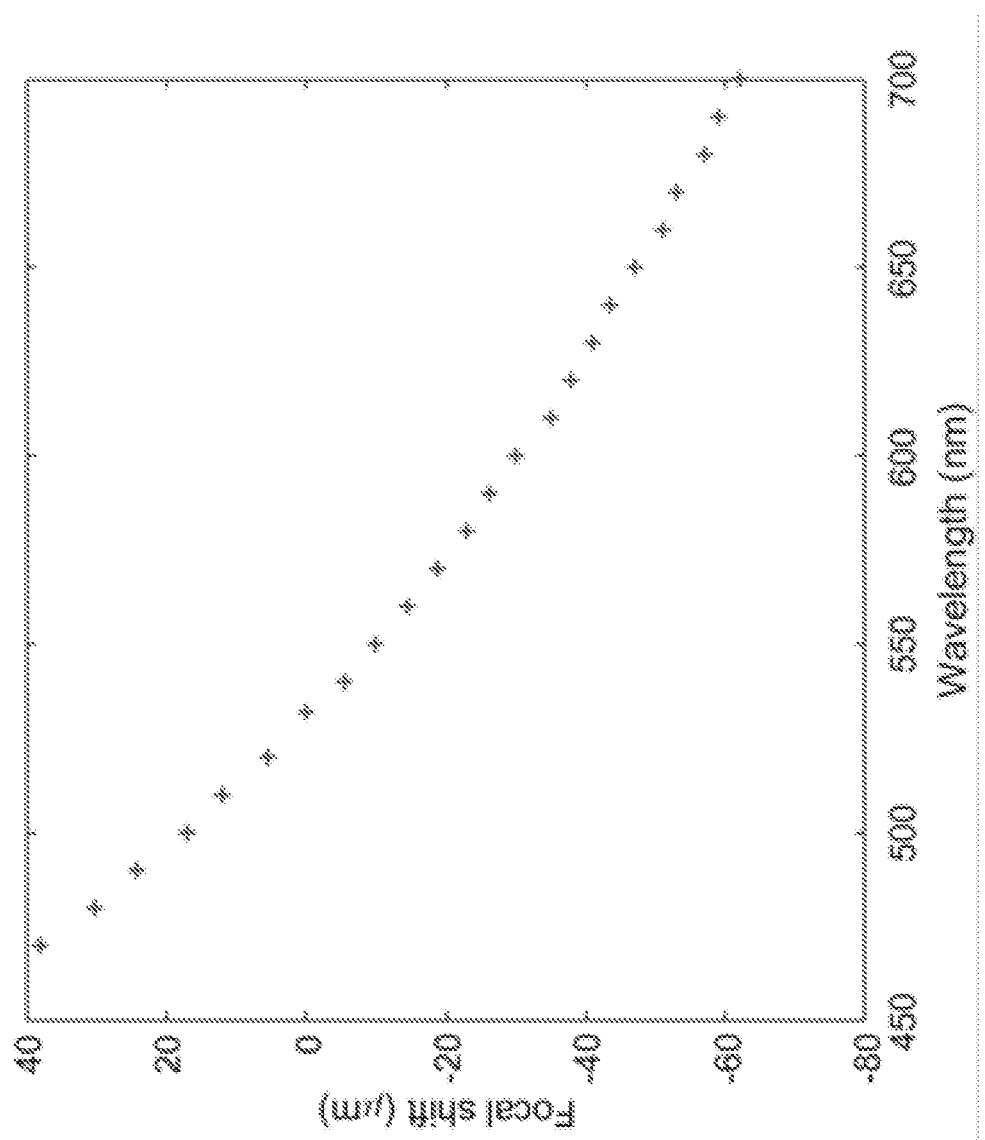
FIG. 5L illustrates a chromatic focal shift of a meta-lens doublet as a function of light source wavelength.
Figure 5M:
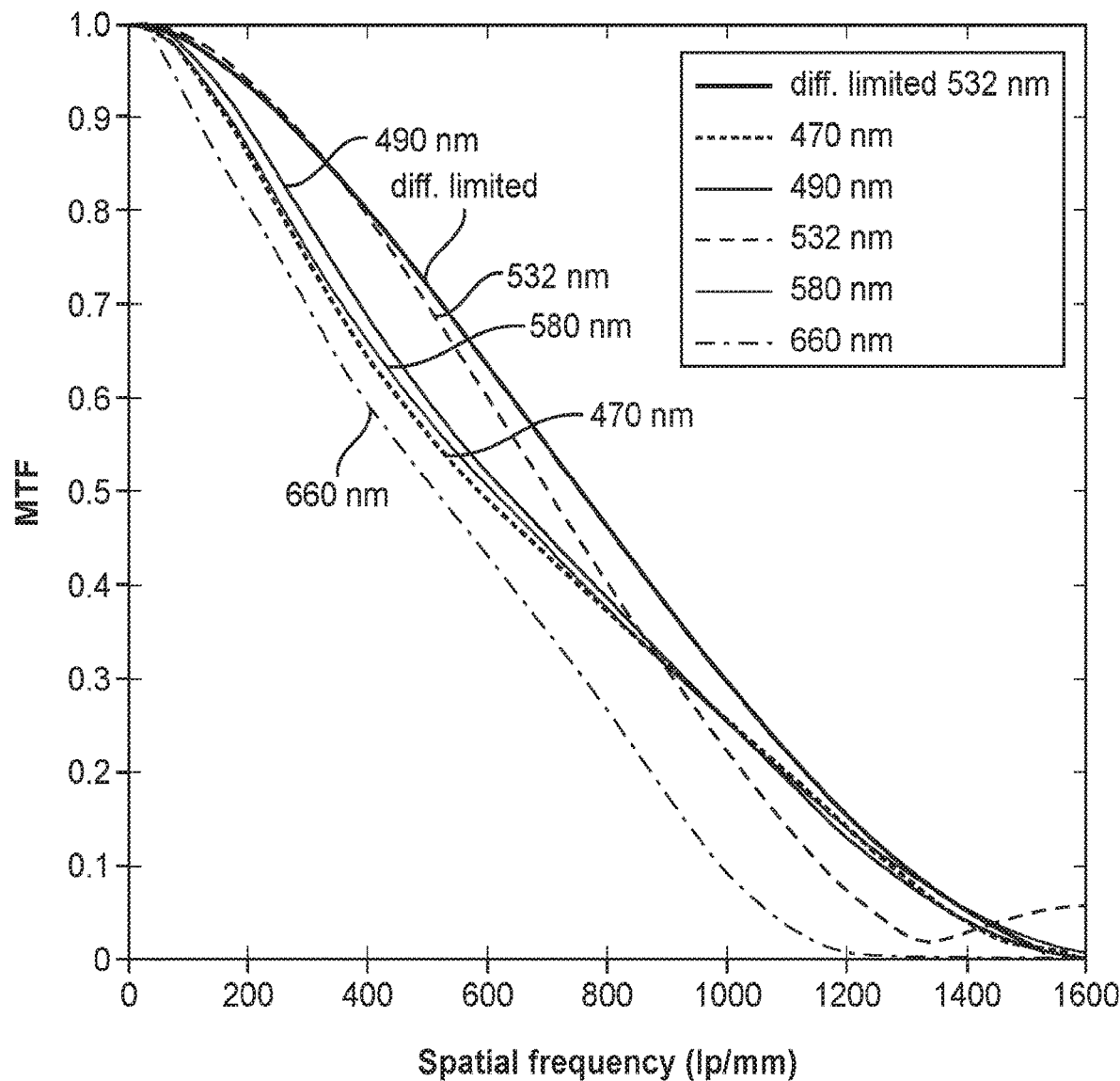
FIG. 5M illustrates MTF curves for light sources of different center wavelengths.

FIG. 5K illustrates MTF curves for light having a wavelength of about 532 nm in normal incidence and having different bandwidths, according to some embodiments of the present disclosure. FIG. 5L illustrates a chromatic focal shift of a meta-lens doublet as a function of light source wavelength, according to some embodiments of the present disclosure. The reference wavelength may be, e.g., a design wavelength (A) of about 532 nm. FIG. 5M illustrates MTF curves for light sources of different center wavelengths, according to some embodiments of the present disclosure. The light sources with different center wavelengths may have the same bandwidth of, e.g., about 5 nm. The MTF curves of FIG. 5M show quantitative analysis for the situations illustrated in FIGS. 5G-5J.

As shown in FIG. 5F, although the feature of the resolution target may still be resolved, the contrast drops significantly when the light source bandwidth increases to about 100 nm. This is indicated by a reduction of MTF curve shown in FIG. 5K, which may result from chromatic aberration. As illustrated in FIG. 5L, the chromatic aberration may occur when the focal length changes as the light source wavelength changes.

In some embodiments, even though a meta-lens doublet is designed for a light source of a center wavelength of about 532 nm, the meta-lens doublet may still resolve the target clearly at other wavelengths within a bandwidth of, e.g., about 5 nm.

Figure 6:
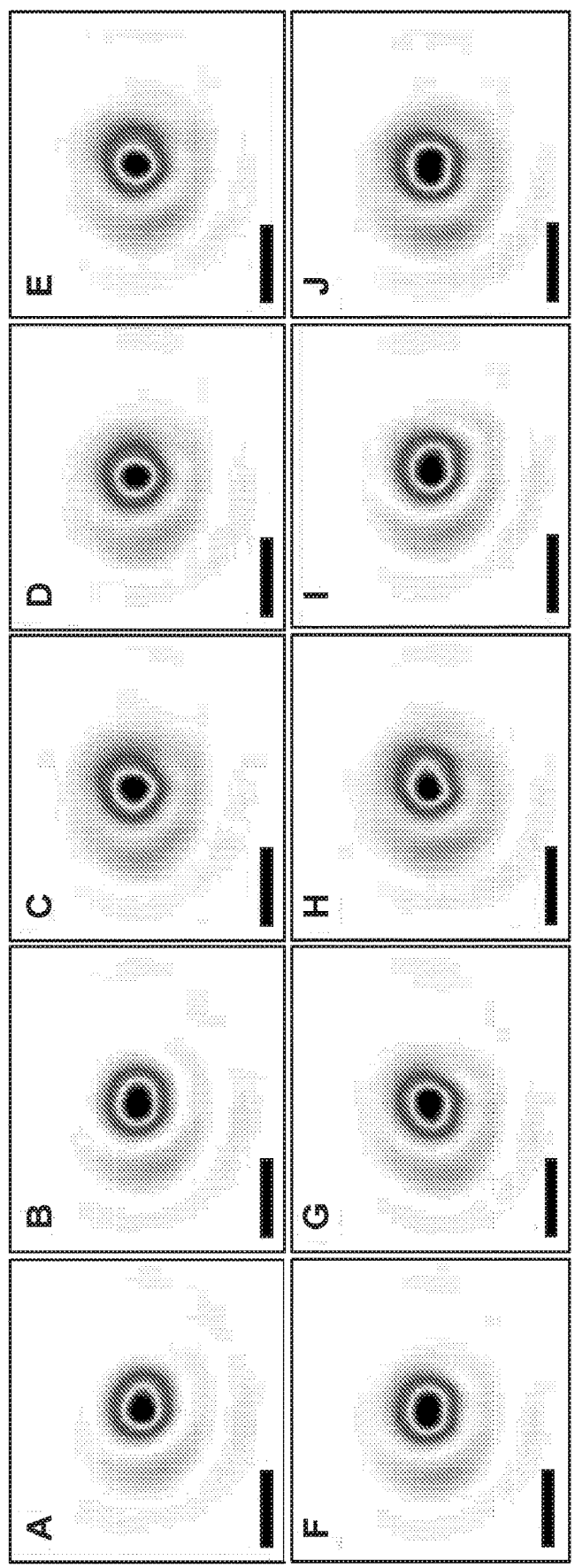
FIG. 6 illustrates intensity profiles of focal spots when the meta-lenses are heated to different temperatures.

In some embodiments, the meta-lens doublet may have a low temperature dependence from about 25° C. to about 70° C. The focal spot may remain diffraction-limited as the temperature changes. FIG. 6 illustrates intensity profiles of focal spots when the meta-lenses are heated to different temperatures, according to some embodiments of the present disclosure. The light source may have a center wavelength of, e.g., about 532 nm and a bandwidth of, e.g., about 30 GHz (28 µm) at normal incidence. The temperatures are: (A) about 25° C., (B) about 30° C., (C) about 35° C., (D) about 40° C., (E) about 45° C., (F) about 50° C., (G) about 55° C., (H) about 60° C., (I) about 65° C. and (J) about 70° C. The scale bars shown in FIG. 6 may have a length of, e.g., about 1.1 µm.

Figure 7:
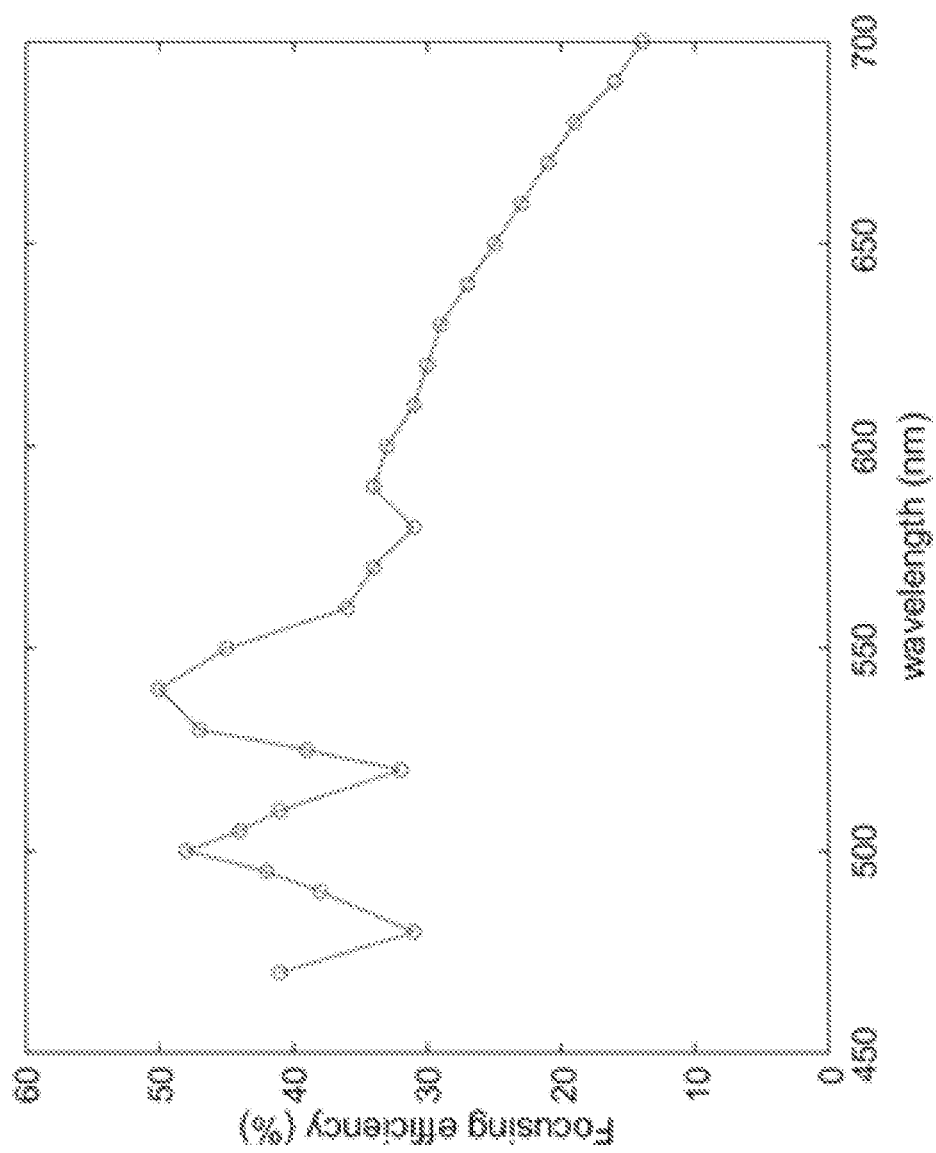
FIG. 7 illustrates focusing efficiency of a meta-lens doublet as a function of wavelength of the light source.

In some embodiments, the maximum focusing efficiency of the meta-lens doublet may be, e.g., about 20%, about 30%, about 40%, about 50%, about 60%, or about 70%. FIG. 7 illustrates focusing efficiency of a meta-lens doublet as a function of wavelength of the light source, according to some embodiments of the present disclosure. The two peaks shown in FIG. 7 may be due to, e.g., fabrication imperfections. The variation in the geometric parameters of nanostructures (e.g., nano-fins and/or nano-pillars) of meta-lenses may result in a spectral shift of maximum polarization conversion efficiency. The two peaks may be understood as an average of two efficiency curves corresponding to different sizes of constituent nanostructures.

Fabrication of Meta-Lens Doublet

Although the following fabrication process discloses certain specific values or ranges for fabrication parameters (e.g. rotations per minutes (RPMs), temperatures, time durations, voltages, mixture ratios, etc.), it is to be understood that those values or ranges are shown as examples and that the values or ranges of the parameters for the fabrication steps may vary according to various embodiments of the present disclosure. The sequence of the fabrication steps may be adjusted. Any steps of the fabrication process may be omitted or repeated at any stages.

In some embodiments, the alignment markers are fabricated using electron beam lithography (EBL) on both sides of the substrate with photolithography based on a two-layer lift-off process. The substrate (e.g., fused silica) is cleaned via ozone stripper for about 5 minutes. Piranha etching is conducted for the substrate for about 15 minutes. Acetone bath and isopropyl alcohol (IPA) sonication bath are conducted for the substrate for about 3 minutes each. The Piranha etch is used consistently through the whole fabrication process with an about 3:1 mixture of concentrated sulfuric acid ($H_2SO_4$) with hydrogen peroxide ($H_2O_2$).

The first layer of the lift-off process is a photo-insensitive resist, which is spin-coated with about 3000 rotations per minute (RPM), and is baked at about 180° C. for about 7 minutes. The second layer is a photosensitive Shipley resist, which is spin-coated with about 3000 RPM, baked at about 115° C. for about 3 minutes. The sample is exposed with dose of about 60 mJ/$cm_2$ in the Heidelberg MLA150 tool. For developing MF-319 is used for about 30 seconds. Chromium is thermally evaporated before the resist is removed with a bath of PG-Remover for about 24 hours. After an acetone sonication bath for about 3 minutes, the steps between ozone stripper and PG-Remover are repeated for the backside of the substrate. Large photography alignment marks may be used to align the back side to the front side of the substrate using, e.g., SUSS MA6 Mask Aligner tool.

The metasurfaces may be fabricated using, e.g., $TiO_2$ material. To clean the substrate from any possible remaining residue from the photolithography process, the substrate is again cleaned via ozone stripper, Piranha etch, acetone and isopropyl alcohol (IPA) sonication baths. Electron sensitive resist (e.g., ZEP520A) is spin-coated with about 1750 RPM, baked at about 180° C. for about 5 minutes. ESpacer 300Z is spin-coated at about 1750 RPM on the resist to avoid charging effects because of the poor conductivity of the fused silica substrate. Then EBL is carried out by, e.g., Elionix ELS-F125 at about 125 kV.

The aperture meta-lens is written first. Deionized water is used to remove the ESpacer. Cooled to about 5° C., O-Xylene is used for about 1 minute to develop the sample. During developing, the sample is moved back and forth in the bath to increase surface interaction. After an isopropyl alcohol (IPA) dip, $TiO_2$ is deposited with atomic layer deposition (ALD) in, e.g., Savannah Cambridge Nanotechnology tool. The backside is protected with, e.g., scotch tape. Next, $TiO_2$ is top-down etched through inductively coupled plasma etch (ICP-RIE) using, e.g., Uniaxial Shuttleline ICP RIE tool. The remaining resist is lifted off with a PG-Remover bath for about 24 hours.

Before the fabrication of the focusing meta-lens the extensive cleaning procedure of ozone stripper, piranha etch, acetone bath and IPA bath is carried out again. No sonication is used in order to avoid damaging the aperture metasurface. Five layers of polymethyl methacrylate (PMMA), each of which is spin-coated at about 1000 RPM and is baked at about 180° C. for about 90 seconds, are used as protective material for the aperture metasurface. Next, ZEP520A (Zeon Chemicals) is spin-coated on the backside of the substrate at about 1750 RPM, then extensively baked for about 30 minutes at about 150° C. The PMMA has a melting point of about 160° C., and the proper baking temperature of ZEP520A is about 180° C. Solvent molecules within the resist with a larger velocity than the mean thermal velocity (at about 150° C.) are able to evaporate. After evaporation, remaining molecules form again a substantially equivalent of a Maxwell Boltzmann velocity distribution, allowing new solvent molecules to evaporate. After EBL for the focusing meta-lens, developing, ALD and etching steps are repeated as before. This time no scotch tape is included during the ALD process due to the existence of the PMMA. The PMMA is removed with ZEP520A during a PG-Remover lift-off bath for about 24 hours. During the bath, the sample is held straight to avoid contact of the metasurfaces with the beaker. To remove any possible residue, the sample is held with a pair of tweezers in a Piranha solution for about 5 minutes.

In some embodiments, the meta-lens doublet can be either polarization-insensitive or polarization-sensitive. For example, the nanostructures of both meta-lenses can be 4-fold symmetric or circular nano-pillars to impart the meta-lens doublet polarization-insensitive. Alternatively, the nanostructures of both meta-lenses can be 2-fold symmetric nano-pillars to impart the meta-lens doublet polarization-sensitive. The nanostructures of both meta-lenses can include oxides (e.g., $SiO_2$, $TiO_2$) and/or nitrides (e.g., $Si_3N_4$, GaN).

It is to be understood that the term "design" or "designed" (e.g., as used in "design wavelength," "design focal length" or other similar phrases disclosed herein) refers to parameters set during a design phase; which parameters after fabrication may have an associated tolerance.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to 10% of that numerical value, such as less than or equal to 5%, less than or equal to 4%, less than or equal to 3%, less than or equal to 2%, less than or equal to 1%, less than or equal to 0.5%, less than or equal to 0.1%, or less than or equal to 0.05%. For example, two numerical values can be deemed to be "substantially" the same if a difference between the values is less than or equal to 10% of an average of the values, such as less than or equal to 5%, less than or equal to 4%, less than or equal to ±3%, less than or equal to 2%, less than or equal to 1%, less than or equal to ±0.5%, less than or equal to 0.1%, or less than or equal to 0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device, comprising:
a first meta-lens including a first plurality of nanostructures, the first plurality of nanostructures define a first phase profile of the first meta-lens; and
a second meta-lens optically coupled with the first meta-lens, the second meta-lens including a second plurality of nanostructures, the second plurality of nanostructures define a second phase profile of the second meta-lens;
wherein a combination of the first meta-lens having the first phase profile and the second meta-lens having the second phase profile is configured to correct an aberration of light transmitted through the optical device and conduct a diffraction-limited focusing of at least a portion of the light transmitted through the optical device, and wherein the second meta-lens imparts the second phase profile on the light passing through the second meta-lens determined by:

$$\varphi_{FL}(x, y) = \frac{2\pi}{\lambda_d}\left(\sqrt{x^2 + y^2 + f^2} - f\right) + \sum_{n=1}^{5} b_n\left(\frac{\rho}{R_{FL}}\right)^{2n},$$

wherein w is a positive integer number, $\lambda_d$ is a design wavelength of the optical device, f is a focal length of the optical device, $\rho=\sqrt{x^2+y^2}$ is a radial coordinate, x and y are position coordinates of the second nanostructure with respect to an origin of the x-y plane of the second meta-lens, $R_{FL}$ is a radius of the second meta-lens, and coefficients $b_n$ are optimization parameters, at least one of the coefficients $b_n$ is non-zero.

2. The optical device of claim 1, wherein the combination of the first meta-lens having the first phase profile and the second meta-lens having the second phase profile is configured to correct a spherical aberration, a coma aberration, a Petzval field curvature, a chromatic aberration, or a combination of two or more thereof of the light transmitted through the optical device.

3. The optical device of claim 1, wherein the combination of the first meta-lens having the first phase profile and the second meta-lens having the second phase profile is configured to conduct the diffraction-limited focusing of at least the portion of the light transmitted through the optical device along an optical axis of the optical device.

4. The optical device of claim 1, further comprising:
a substrate having a first side and a second side opposite to the first side;
wherein the first plurality of nanostructures of the first meta-lens are disposed on the first side of the substrate, and the second plurality of nanostructures of the second meta-lens are disposed on the second side of the substrate.

5. The optical device of claim 1, wherein the first meta-lens having the first phase profile is an aperture meta-lens.

6. The optical device of claim 1, wherein the light transmitted through the optical device includes chief light rays and marginal light rays, and wherein the first meta-lens having the first phase profile is configured to correct a positive spherical aberration or a negative spherical aberration by converging the chief light rays and diverging the marginal light rays.

7. The optical device of claim 1, wherein the light transmitted through the optical device includes chief light rays and marginal light rays, and wherein the first meta-lens having the first phase profile is configured to increase a first effective focal length for the marginal light rays and decrease a second effective focal length for the chief light rays.

8. The optical device of claim 1, wherein the second meta-lens having the second phase profile is a focusing meta-lens.

9. The optical device of claim 1, wherein the light transmitted through the optical device includes a plurality of light rays having different incident angles, and wherein the second meta-lens having the second phase profile is configured to bend the light rays having the different incident angles such that the light rays having the different incident angles are focused along an optical axis of the optical device that is perpendicular to a focal plane of the optical device.

10. The optical device of claim 1, wherein the first phase profile of the first meta-lens corresponds to a phase profile of a Schmidt plate, and wherein the second phase profile of the second meta-lens corresponds to a phase profile of an aspherical lens.

11. The optical device of claim 1, wherein the first plurality of nanostructures of the first meta-lens include nano-fins or nano-pillars, and wherein the second plurality of nanostructures of the second meta-lens include nano-fins or nano-pillars.

12. The optical device of claim 1, wherein each first nanostructure of the first plurality of nanostructures has at least one design parameter of the first nanostructure that imparts a phase shift of the light passing through the first nanostructure, and wherein each second nanostructure of the second plurality of nanostructures has at least one design parameter of the second nanostructure that imparts a phase shift of the light passing through the second nanostructure.

13. The optical device of claim 1, wherein for each first nanostructure located in an x-y plane of the first meta-lens, a phase of the light passing through the first nanostructure is determined by:

$$\varphi_{AL}(x, y) = \sum_{n=1}^{5} a_n\left(\frac{\rho}{R_{AL}}\right)^{2n},$$

wherein $\rho=\sqrt{x^2+y^2}$ is a radial coordinate, x and y are position coordinates of the first nanostructure with respect to an origin of the x-y plane of the first meta-lens, $R_{AL}$ is a radius of the first meta-lens, and coefficient $\alpha_n$ is an optimization parameter.

14. A meta-lens doublet, comprising:
a substrate having a first surface and a second surface opposite to the first surface;
a plurality of first nanostructures disposed on the first surface of the substrate; and
a plurality of second nanostructures disposed on the second surface of the substrate;
wherein the plurality of first nanostructures and the plurality of second nanostructures together define a lens profile that corrects an aberration of light transmitting through the meta-lens doublet and conducts focusing of the light, and
wherein the plurality of second nanostructures imparts a phase profile on the light passing through the plurality of second nanostructures determined by:

$$\varphi_{FL}(x, y) = \frac{2\pi}{\lambda_d}\left(\sqrt{x^2 + y^2 + f^2} - f\right) + \sum_{n=1}^{5} b_n\left(\frac{\rho}{R_{FL}}\right)^{2n},$$

wherein w is a positive integer number, $\lambda_d$ is a design wavelength of the optical device, f is a focal length of the optical device, $\rho=\sqrt{x^2+y^2}$ is a radial coordinate, x and y are position coordinates of the second nanostructure with respect to an origin of the x-y plane of the second meta-lens, $R_{FL}$ is a radius of the plurality of second nanostructures, and coefficients $b_n$ are optimization parameters, at least one of the coefficients $b_n$ is non-zero.

15. The meta-lens doublet of claim 14, wherein the meta-lens doublet has a design wavelength that is within a visible spectrum.

16. The meta-lens doublet of claim 14, wherein the plurality of first nanostructures and the plurality of second nanostructures are 4-fold symmetric or circular nano-pillars to impart the meta-lens doublet polarization-insensitive.

17. The meta-lens doublet of claim 14, wherein the plurality of first nanostructures and the plurality of second nanostructures are 2-fold symmetric nano-pillars to impart the meta-lens doublet polarization-sensitive.

18. The meta-lens doublet of claim 14, wherein the plurality of first nanostructures or the plurality of second nanostructures include oxides and nitrides.

19. The meta-lens doublet of claim 18, wherein the oxides include $SiO_2$ or $TiO_2$ and the nitrides include $Si_3N_4$ or GaN.

20. The meta-lens doublet of claim 14, wherein the light transmitted through the meta-lens doublet includes chief light rays and marginal light rays, and wherein the plurality of first nanostructures form an aperture meta-lens configured to converge the chief light rays and diverge the marginal light rays.

21. The meta-lens doublet of claim 14, wherein the light transmitted through the meta-lens doublet includes a plurality of light rays having different incident angles, and wherein the plurality of second nanostructures form a focusing meta-lens configured to bend the light rays having the different incident angles such that the light rays having the different incident angles are focused along an optical axis of the meta-lens doublet perpendicular to a focal plane.

22. The meta-lens doublet of claim 14, wherein the plurality of second nanostructures form a focusing meta-lens, wherein a phase of light passing through each of the second nanostructures is determined by a hyperbolic function and a polynomial function, wherein the hyperbolic function depends on a design wavelength of the meta-lens doublet, a radial coordinate of the second nanostructure, and a focal length of the meta-lens doublet, and wherein the polynomial function depends on a radial coordinate of the second nanostructure and a radius of the focusing meta-lens.

23. The optical device of claim 1, wherein w is 5.

24. The optical device of claim 1, wherein $b_n$ is a range between −15.8389 and 4.9531.

25. The meta-lens doublet of claim 14, wherein w is 5.

26. The meta-lens doublet of claim 14, wherein $b_n$ is a range between −15.8389 and 4.9531.

* * * * *